(12) United States Patent
Liao et al.

(10) Patent No.: US 10,827,468 B2
(45) Date of Patent: Nov. 3, 2020

(54) UE BEHAVIOUR ON RESOURCE ASSIGNMENT COLLISION BETWEEN CORESET/SEARCH SPACE AND SFI ASSIGNMENT

(71) Applicant: Mediatek Inc., Hsin-Chu (TW)

(72) Inventors: Yiju Liao, Hsinchu (TW); Chien Hwa Hwang, Hsinchu (TW); Chien-Chang Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/202,306

(22) Filed: Nov. 28, 2018

(65) Prior Publication Data

US 2019/0166593 A1    May 30, 2019

Related U.S. Application Data

(60) Provisional application No. 62/592,530, filed on Nov. 30, 2017.

(51) Int. Cl.
*H04W 72/04* (2009.01)
*H04L 5/00* (2006.01)

(52) U.S. Cl.
CPC ....... *H04W 72/0406* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS

| 2014/0153484 | A1 | 6/2014 | Kim et al. |
| 2019/0059084 | A1* | 2/2019 | Lee ................. H04W 72/0446 |
| 2019/0306737 | A1* | 10/2019 | Kwak ................ H04W 24/08 |

FOREIGN PATENT DOCUMENTS

| CN | 101964697 A | 2/2011 |
| CN | 102801509 A | 11/2012 |

(Continued)

OTHER PUBLICATIONS

International Search Report of PCT/CN2018/118419, dated Feb. 28, 2019.

(Continued)

*Primary Examiner* — Saumit Shah
(74) *Attorney, Agent, or Firm* — Locke Lord LLP; Tim Tingkang Xia, Esq.

(57) ABSTRACT

A method of wireless communication of a UE is provided. The UE receives a semi-static assignment from a network, indicating each of a plurality of symbol periods in a slot being assigned as one of: a downlink symbol period, a semi-static unknown symbol period, and an uplink symbol period. The UE receives a dynamic slot format indicator (SFI), the dynamic SFI indicating M of the plurality of symbol periods being reassigned dynamically from semi-static unknown symbol periods to symbol periods not being monitored by the UE for PDCCH data. The UE determines that a CORESET of Y symbol periods contains N of the M reassigned symbol periods. The UE (1) refrains from decoding data carried in the Y symbol periods of the CORESET or (2) decodes data carried in (Y-N) symbol periods of the CORESET with exclusion of data carried in the N reassigned symbol periods of the CORESET.

17 Claims, 18 Drawing Sheets

(52) U.S. Cl.
CPC .......... *H04L 5/0037* (2013.01); *H04W 72/04* (2013.01); *H04W 72/0446* (2013.01)

(56) References Cited

FOREIGN PATENT DOCUMENTS

| TW | 201828667 A | 8/2018 |
|----|-------------|--------|
| WO | 2018145019 A1 | 8/2018 |

OTHER PUBLICATIONS

Taiwan Patent Office, "Office Action", dated May 13, 2020, Taiwan.
3GPP TSG-RAN WG2 NR #99bis Meeting, R2-1711195, Prague, Czech, Oct. 9-13, 2017.

* cited by examiner

UE BEHAVIOUR ON RESOURCE ASSIGNMENT COLLISION BETWEEN CORESET/SEARCH SPACE AND SFI ASSIGNMENT

CROSS-REFERENCE TO RELATED APPLICATION(S)

This application claims the benefits of U.S. Provisional Application Ser. No. 62/592,530, entitled "UE BEHAVIOUR ON RESOURCE COLLISION BETWEEN CORESET/SEARCH SPACE AND SFI ASSIGNMENT" and filed on Nov. 30, 2017, which is expressly incorporated by reference herein in their entirety.

BACKGROUND

Field

The present disclosure relates generally to communication systems, and more particularly, to techniques of solving resource assignment collision between CORESET and dynamic SFI.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a semi-static assignment from a network, the semi-static assignment indicating each of a plurality of symbol periods in a slot being assigned as one of: a downlink symbol period, a semi-static unknown symbol period, and an uplink symbol period. The UE receives a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0. The UE determines that a CORESET of Y symbol periods contains N of the M reassigned symbol periods, Y being an integer greater than 0, N being an integer greater than 0 and equal to or smaller than Y. The UE either (1) refrains from decoding data carried in the Y symbol periods of the CORESET or (2) decodes data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
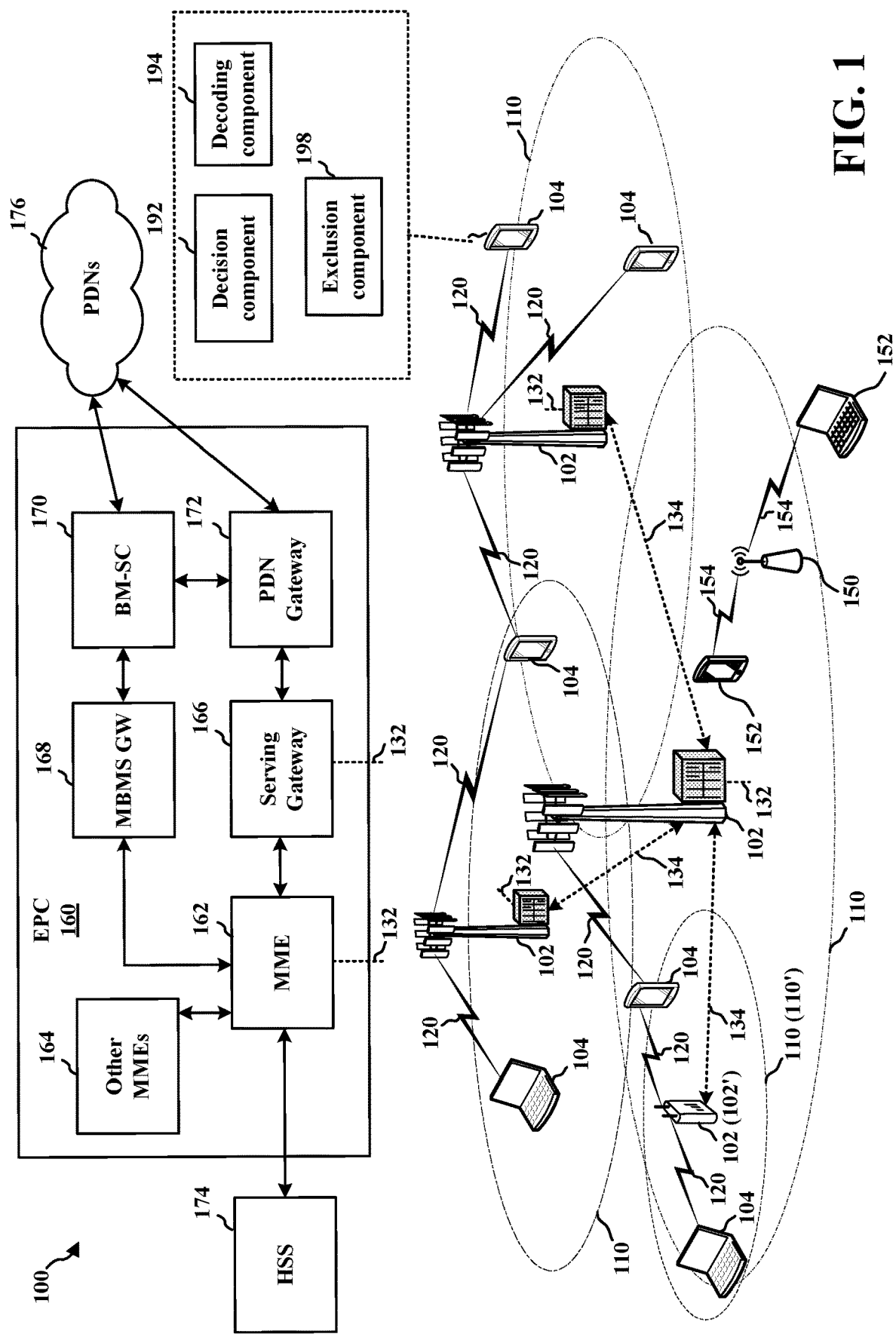
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a decision component 192, a decoding component 194, and an exclusion component 198. The UE receives a semi-static assignment from a network, the semi-static assignment indicating each of a plurality of symbol periods in a slot being assigned as one of: a downlink symbol period, a semi-static unknown symbol period, and an uplink symbol period. The UE receives a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0. The decision component 192 determines that a CORESET of Y symbol periods contains N of the M reassigned symbol periods, Y being an integer greater than 0, N being an integer greater than 0 and equal to or smaller than Y. The decoding component 194 either (1) refrains from decoding data carried in the Y symbol periods of the CORESET or (2) decodes data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods.

Figure 2:
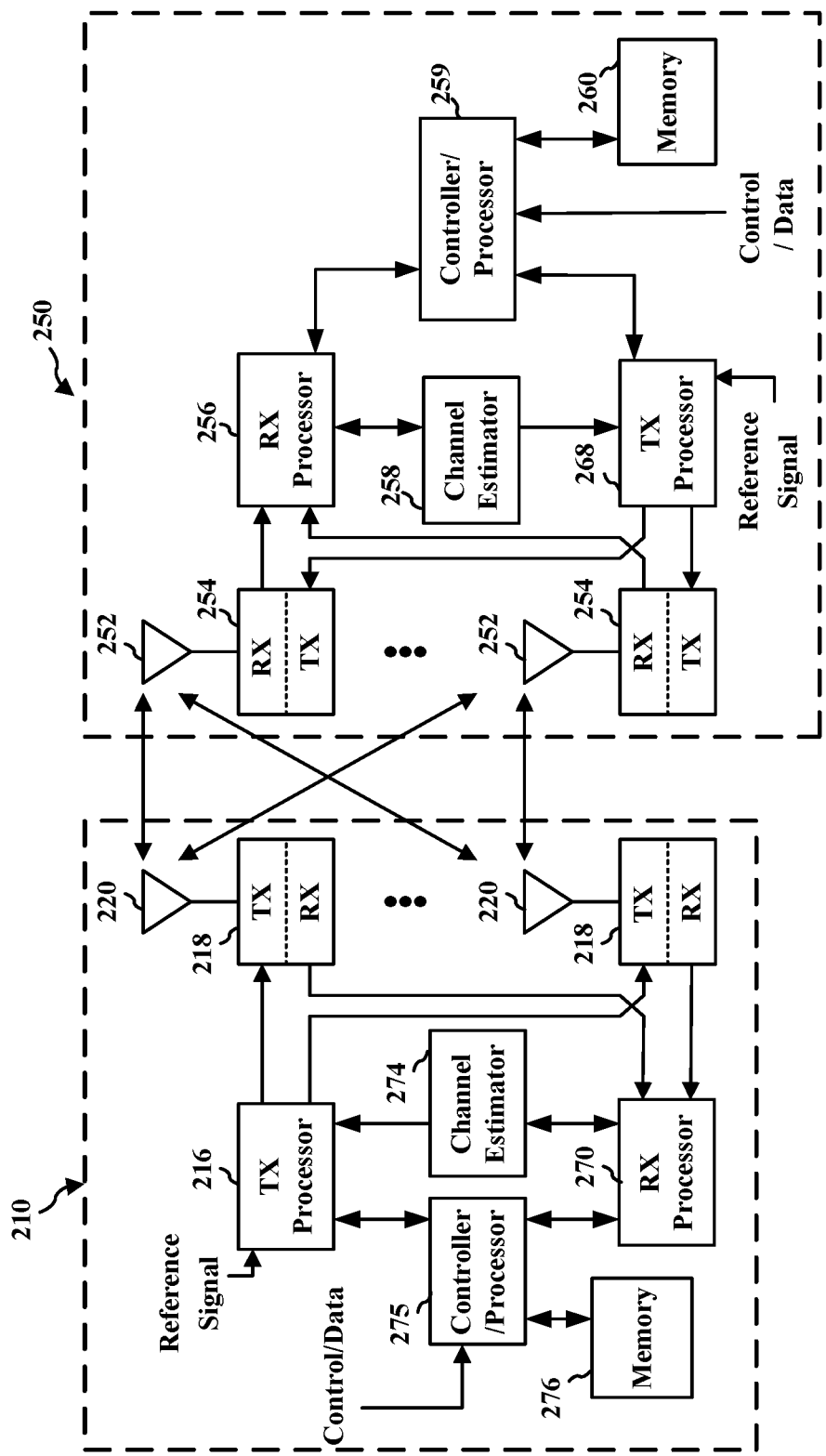
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
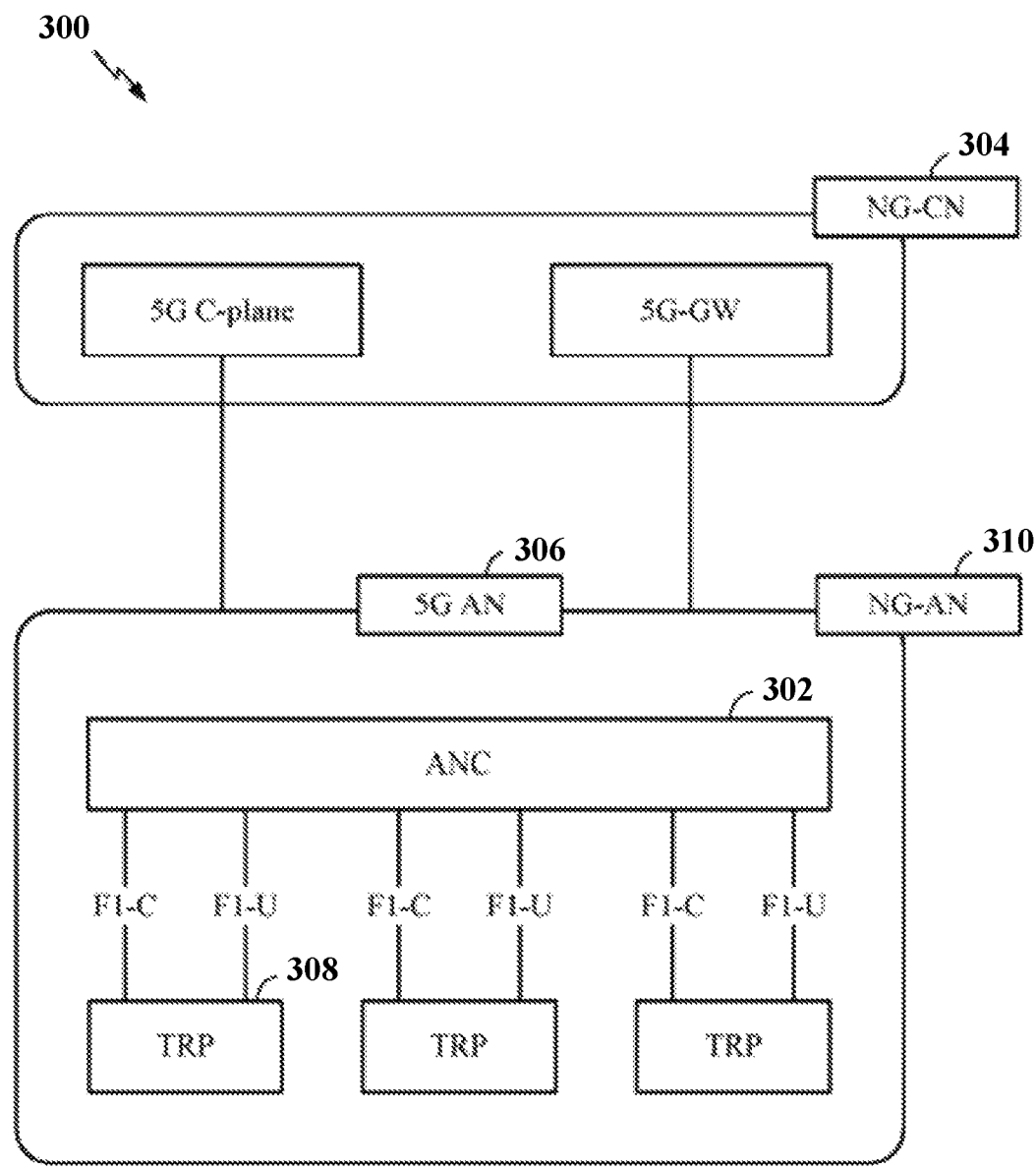
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
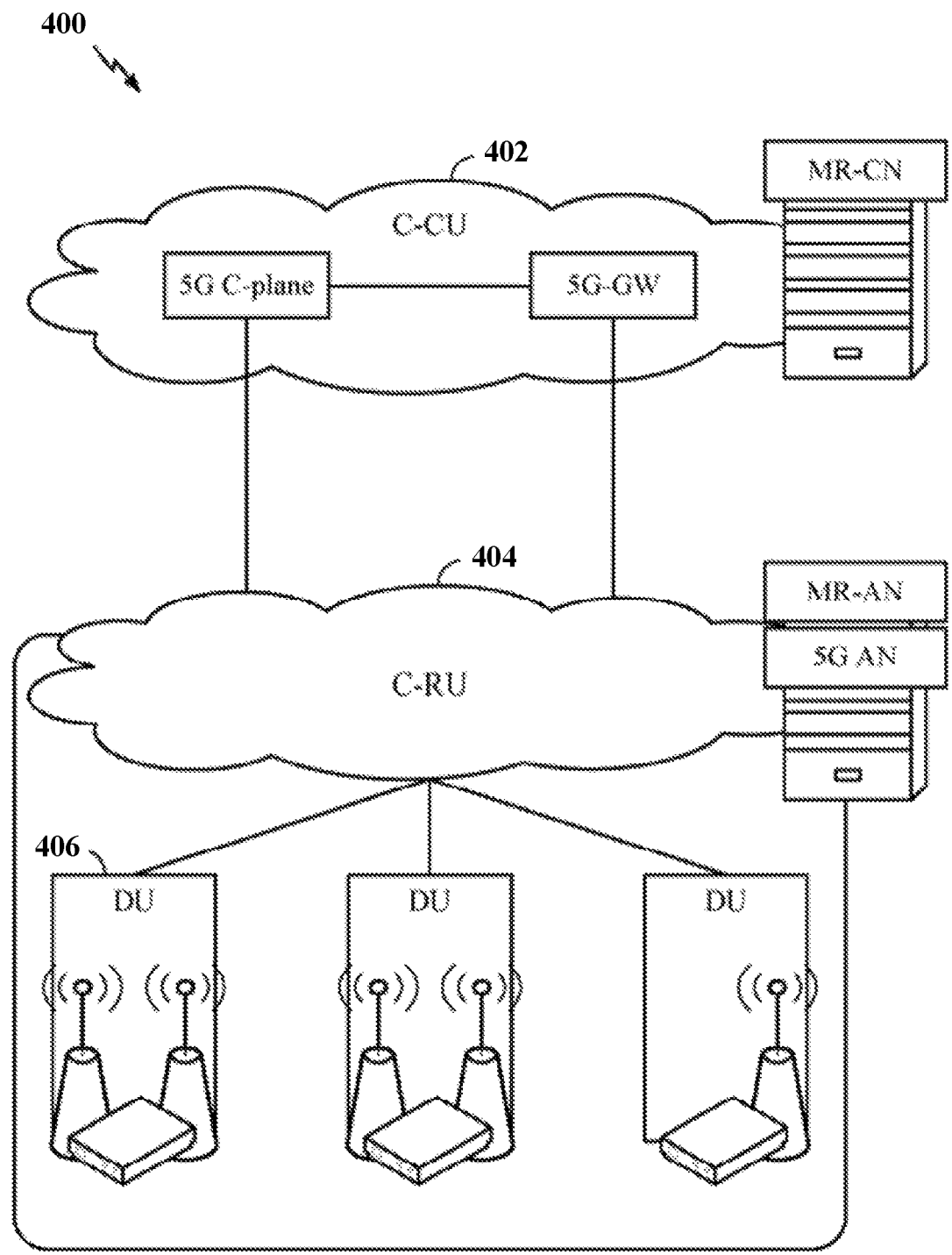
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
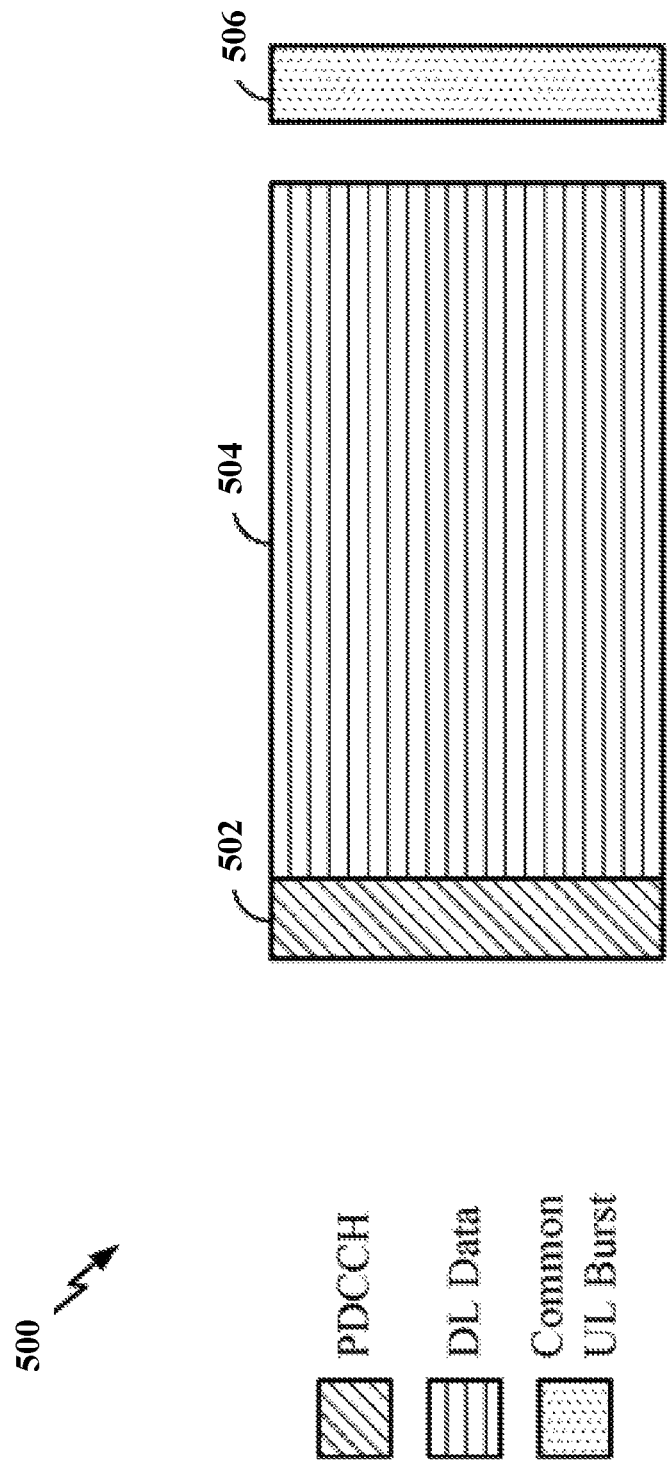
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
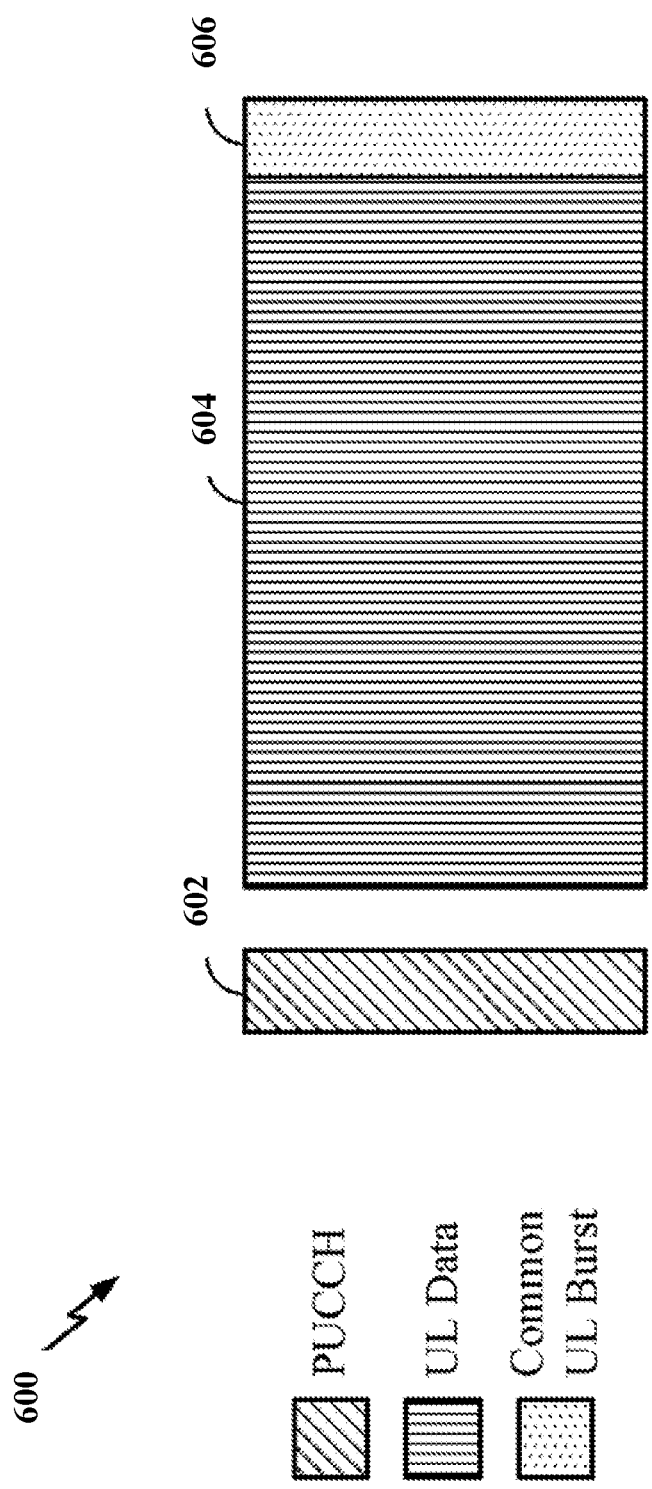
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
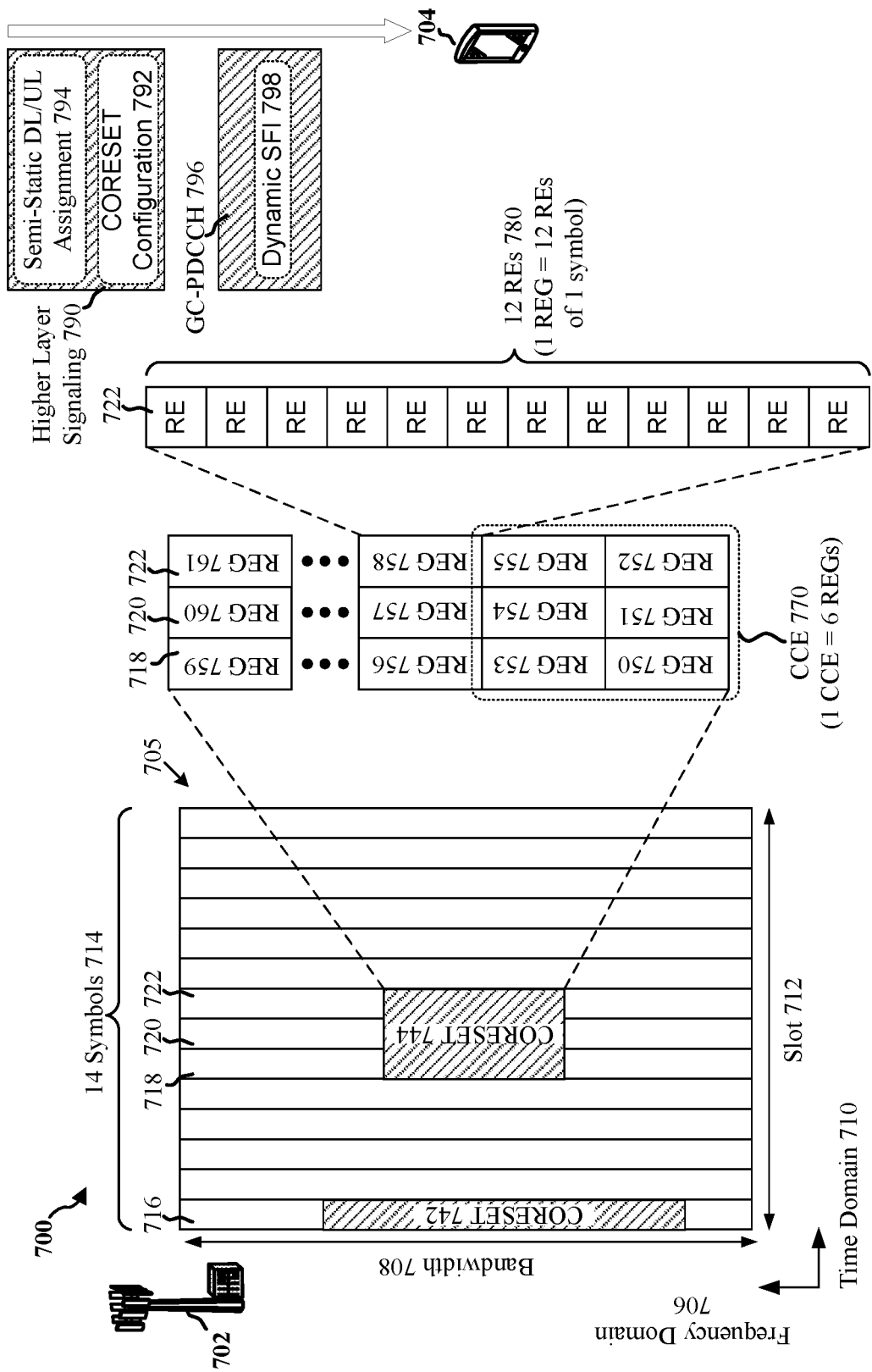
FIG. 7 is a diagram illustrating communications between a UE and a base station.

FIG. 7 is a diagram 700 illustrating communications between a UE 704 and a base station 702. In this example, the base station 702 communicates with the UE 704 on a resource grid 705. In particular, the resource grid 705 occupies a slot 712 in a time domain 710 and a bandwidth 708 in a frequency domain 706. In this example, the slot 712 has 14 symbols (e.g., OFDM symbols) 714. The base station transmits downlink control information (DCI) in one or more control resource sets (CORESETs). In the frequency domain 706, resource allocation for a CORESET may be contiguous or noncontiguous. In the time domain 710, a CORESET typically spans one to three consecutive symbols. In this example, there are two CORESETs in the resource grid 705: a one-symbol CORESET 742 and a three-symbol CORESET 744. The CORESET 742 is located in a symbol 716 of the slot 712, and the CORESET 744 is located in three symbols 718, 720 and 722.

Resource elements (REs) in CORESET is organized in resource element groups (REGs). And one REG (e.g., a REG 758) includes 12 resource elements (e.g., 12 resource elements 780) in one symbol (e.g., the symbol 722). In this example, the CORESET 744 includes multiple REGs in each of the three symbols 718, 720 and 722. For example, the CORESET 744 includes REG 750, REG 753, REG 756, . . . , REG 759 in symbol 718. One control channel element (CCE) (e.g., a CCE 770) includes multiple (e.g., six) REGs (e.g., REGs 750 to 755). The number of allocated CCEs for PDCCH is aggregation level. Typically, aggregation level can be 1, 2, 4, 8, and 16.

A PDCCH search space is an area in a CORESET where PDCCH data may be carried. The UE 704 performs blind decoding in search spaces that are assigned to the UE 704 in a CORESET to find PDCCH data (e.g., downlink control information). Further, the UE 704 may receive a higher layer signaling 790 containing a CORESET configuration 792, based on which the UE may decide the resources allocated to a corresponding CORESET in the time domain 710 and in the frequency domain 706.

Figure 8:
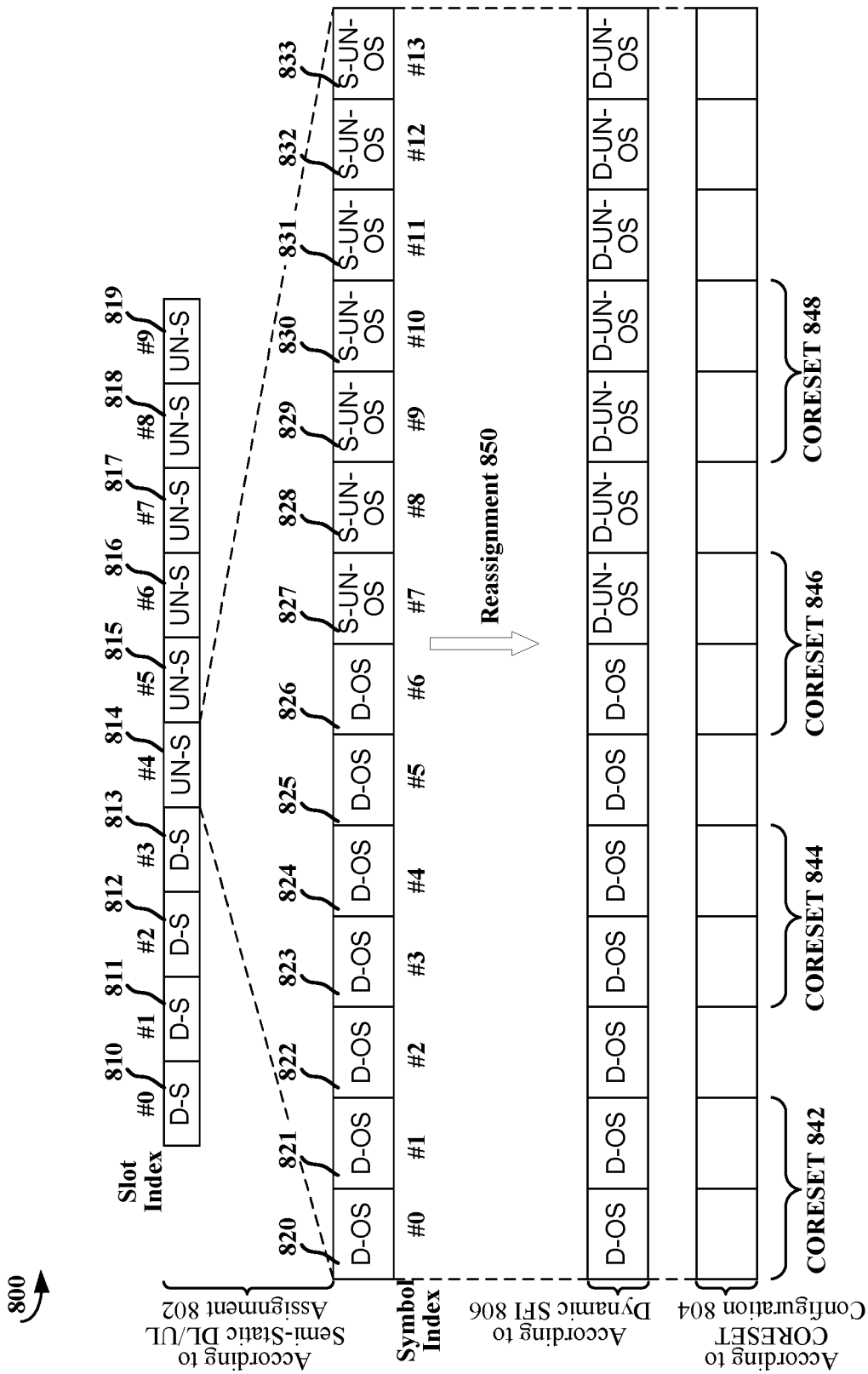
FIG. 8 is a diagram illustrating a resource assignment collision between a CORESET and a slot format indicator (SFI).

FIG. 8 is a diagram 800 illustrating a resource assignment collision between a CORESET and a slot format indicator (SFI). A UE may receive a semi-static downlink/uplink (DL/UL) assignment (e.g., a semi-static DL/UL assignment 794 as shown in FIG. 7) carried in higher layer signaling (e.g., the higher layer signaling 790 as shown in FIG. 7) from a base station. The semi-static DL/UL assignment may be at slot-level and/or symbol-level. In this example, the UE 704 receives a semi-static DL/UL assignment 802. In particular, the semi-static DL/UL assignment 802 is received from cell-specific radio resource control (RRC) signaling and additional UE-specific RRC signaling. According to the part of the semi-static DL/UL assignment 802 configured by the cell-specific RRC signaling, the UE 704 assigns slot #0 810 to slot #3 813 as DL slots (designated as "D-S" in FIG. 8), and assigns slot #4 814 to slot #9 819 as unknown slots (designated as "UN-S" in FIG. 8) or flexible slots. In other words, the UE 704 configures the slots #0 810 to #9 819 as {D-S, D-S, D-S, D-S, UN-S, UN-S, UN-S, UN-S, UN-S, UN-S}. In this example, according to the part of the semi-static DL/UL assignment 802 configured by the additional UE-specific RRC signaling, with respect to the slot #4 814, the UE 704 assigns symbol #0 820 to symbol #6 826 as DL symbols (designated as "D-OS" in FIG. 8), and assigns symbol #7 827 to symbol #13 833 as semi-static unknown symbols (designated as "S-UN-OS" in FIG. 8).

On the other hand, a base station may transmit a dynamic SFI (e.g., a dynamic SFI 798 as shown in FIG. 7) in a group common PDCCH (GC-PDCCH) (e.g., a GC-PDCCH 796 as shown in FIG. 7). A dynamic SFI indicates dynamic DL/UL assignment for a particular unknown slot. A UE may override a semi-static unknown symbol (e.g., the semi-static unknown symbols #7 827 to #13 833). In particular, a DL symbol or an UL symbol (designated as "U-OS") cannot be overridden by a dynamic SFI, while a semi-static unknown symbol can be overridden to a dynamic unknown symbol (designated as "D-UN-OS" in FIG. 8), a downlink symbol, or an uplink symbol. In this example, according to a dynamic SFI 806, the UE 704 reassigns all semi-static unknown symbols (i.e., the symbols #7 827 to #13 833) as dynamic unknown symbols in a reassignment 850. After the reassignment 850, the symbols #0 820 to #13 833 within the slot #4 814 are as {D-OS, D-OS, D-OS, D-OS, D-OS, D-OS, D-OS, D-UN-OS, D-UN-OS, D-UN-OS, D-UN-OS, D-UN-OS, D-UN-OS, D-UN-OS}.

Moreover, a UE may receive a CORESET configuration (e.g., the CORESET configuration 792 as shown in FIG. 7) and search space configurations carried in a higher layer signaling (e.g., the higher layer signaling 790) from a base station. Based on the CORESET configuration, the UE can determine resource allocation of the corresponding CORESET. Based on the search space configurations, the UE can determine parameters regarding PDCCH candidate monitoring such as slot-level monitoring occasion, slot-level offset and symbol-level bitmap. The base station may transmit the CORESET configuration and the search space configurations through UE-specific RRC signaling. Generally speaking, the periodicity of the (re)configuration of UE-specific RRC signaling would be longer than the periodicity of dynamic SFI signaling. In this example, according to the CORESET configuration and the search space configurations, the UE 704 needs to monitor PDCCH candidates located in search spaces of four two-symbol CORESETs: in the time domain, a CORESET 842 located in the symbol #0 820 and the symbol #1 821, a CORESET 844 located in the symbol #3 823 and the symbol #4 824, a CORESET 846 in the symbol #6 826 and the symbol #7 827, and a CORESET 848 in the symbol #9 829 and the symbol #10 830.

A GC-PDCCH is transmitted to a group of UEs, and the periodicity of the (re)configuration of UE-specific RRC signaling is different from the periodicity of dynamic SFI signaling. Therefore, it is likely to cause resource assignment collision between CORESET and dynamic SFI. In this example, the symbol #7 827 is originally a semi-static unknown symbol according to the semi-static DL/UL assignment 802. However, the UE 704 reassigns the symbol #7 827 as dynamic unknown symbol according to the dynamic SFI 806. Generally, the UE 704 needs to monitor PDCCH data in semi-static unknown symbols, while the UE 704 does not need to monitor PDCCH data in dynamic unknown symbols. In this example, the UE 704 is configured to monitor PDCCH data on the two symbols occupied by the CORESET 846: the symbol #6 826 and the symbol #7 827. After the symbol #7 827 has been reassigned to a dynamic unknown symbol according to the dynamic SFI 806, the UE 704 does not monitor PDCCH data in that symbol. Therefore, there is a resource assignment collision between the CORESET 846 and the dynamic SFI 806 in the symbol #7 827. Similarly, in this example, there are resource assignment collisions between the CORESET 848 and the dynamic SFI 806 in the symbol #9 829 and the symbol #10 830.

In response to the resource assignment collisions, the UE 704 may take different actions (or adopt different behaviors) to handle the resource assignment collisions. These UE behaviors are illustrated with reference to FIGS. 9-15 infra.

Figure 9:
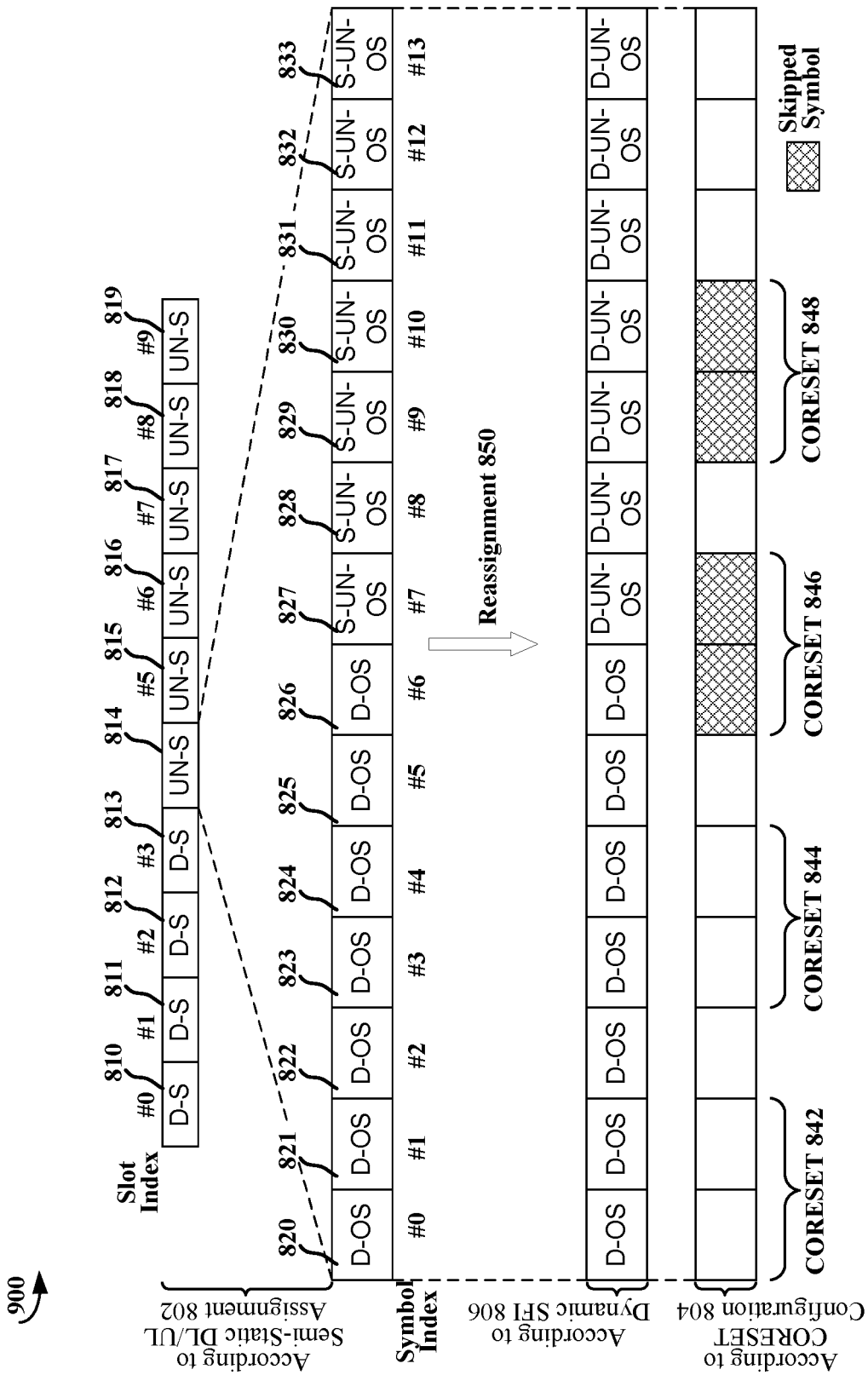
FIG. 9 is a diagram illustrating a first technique adopted by the UE in response to resource assignment collision between CORESET and dynamic SFI.

FIG. 9 is a diagram 900 illustrating a first technique adopted by the UE 704 in response to resource assignment collision between a CORESET and a dynamic SFI. As shown in FIG. 8, there is a resource assignment collision between the CORESET 846 and the dynamic SFI 806 in the symbol #7 827. Similarly, there are resource assignment collisions between the CORESET 848 and dynamic SFI 806 in the symbol #9 829 and the symbol #10 830.

In certain configurations, the UE 704 may adopt a first technique. More specifically, the UE 704 does not monitor PDCCH data in a dynamic unknown symbol (i.e., "D-UN-OS") or a uplink symbol (i.e., "U-OS"). If any symbol within one monitored CORESET is reassigned as dynamic unknown symbol (i.e., "D-UN-OS") or uplink symbol (i.e., "U-OS") according to a dynamic SFI, then the UE does not monitor PDCCH data in this entire CORESET. In other words, the UE is refrained from decoding PDCCH data carried in all symbol(s) in this CORESET. Put in another way, the UE skips PDCCH data monitoring in all symbol(s) in this CORESET.

Moreover, in terms of the UE capability on the number of PDCCH blind decoding, there are two different options for this technique. Generally, the UE may perform a maximum number of blind decoding. According to an Option 1.1, the UE does not count the skipped number of blind decoding in the maximum number of blind decoding for a UE. Therefore, the total number of blind decoding that the UE can perform within a time period is the same as that of the case where there is no resource assignment collision.

According to an Option 1.2, the UE counts the skipped number of blind decoding in the maximum number of blind decoding for a UE. Therefore, the total number of blind decoding that the UE can perform within a time period is smaller than that of the case where there is no resource assignment collision.

In this example illustrated in FIG. 9, the UE 704 skips PDCCH data monitoring in the search spaces of CORESET 846 and the CORESET 848, because the symbol #7 within the CORESET 846 and the symbol #9 829 and the symbol #10 830 within the CORESET 848 are reassigned as dynamic unknown symbols (i.e., "D-UN-OS") according to the dynamic SFI 806. As a result, the UE 704 skips PDCCH data monitoring in two entire CORESETs 846 and 848.

Figure 10:
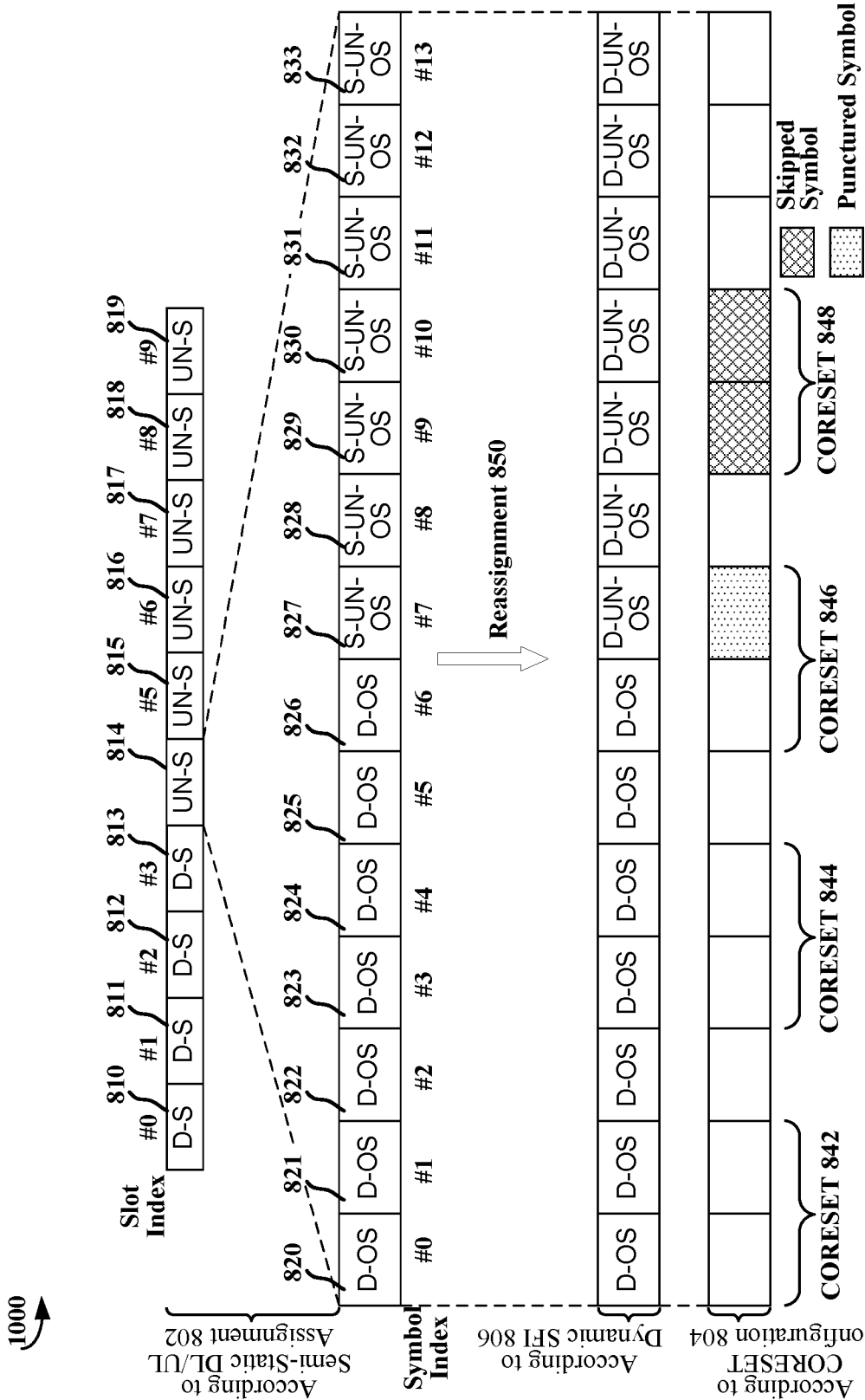
FIG. 10 is a diagram illustrating a second technique adopted by the UE in response to resource assignment collision between CORESET and dynamic SFI.

FIG. 10 is a diagram 1000 illustrating a second technique adopted by the UE 704 in response to resource assignment collision between CORESET and dynamic SFI. Again, as shown in FIG. 8, there is a resource assignment collision between the CORESET 846 and the dynamic SFI 806 in the symbol #7 827. Similarly, there are resource assignment collisions between the CORESET 848 and dynamic SFI 806 in the symbol #9 829 and the symbol #10 830.

In certain configurations, the UE 704 may adopt a second technique. More specifically, if the number N (e.g., N is 1) of reassigned symbols (unknown or uplink symbols) is smaller than the number Y (e.g., Y is 2) of symbols in one CORESET (i.e., there is at least one symbol not reassigned in the CORESET), the UE performs symbol-level rate-matching or puncturing in the N reassigned symbol(s) and monitors PDCCH data on the (Y-N) (e.g., (Y-N) is 1) symbols not reassigned. In other words, the UE 704 still performs bind decoding on the CORESET, but considers no data are carried in the N reassigned symbol(s).

Moreover, in terms of PDCCH candidate number per aggregation level (AL), there are two options for this technique. According to an Option 2.1, the PDCCH candidate number per aggregation level decreases as aggregation level increases. For example, the PDCCH candidate number is 6, 6, 2 and 2 for aggregation level of 1, 2, 4 and 8, respectively. If a CORESET includes two symbols and one of the two symbols is rate-matched or punctured, then the candidate number becomes 3, 3, 1 and 1 for aggregation level of 1, 2, 4 and 8, respectively.

According to an Option 2.2, the PDCCH candidate number per aggregation level stays unchanged.

Furthermore, considering the total number of blind decoding, there are two options. According to an Option 2.3, the UE counts the new number (e.g., the number in the Option 2.1) of blind decoding in the maximum number of blind decoding for a UE. Therefore, the total number of blind decoding that the UE can perform within a time period would be no larger than that of the case where there is no resource assignment collision.

According to an Option 2.4, the UE counts the old number (e.g., the number in the Option 2.2) of blind decoding in the maximum number of blind decoding. Therefore, the total number of blind decoding that the UE can perform within a time period equals to the maximum number of blind decoding of the case where there is no resource assignment collision.

In this technique, the resource in the (Y-N) symbols not reassigned would not be wasted. There is a scheduling opportunity for the UE, although some of the symbols are reassigned according to the dynamic SFI.

In this example illustrated in FIG. 10, the UE 704 skips PDCCH data monitoring in the CORESET 848, because the symbol #9 829 and the symbol #10 830 within the CORESET 848 are both reassigned as dynamic unknown symbols (i.e., "D-UN-OS") according to the dynamic SFI 806. The UE 704 does not reassign the symbol #6 826 in the CORESET 846. In the CORESET 846, the number N of reassigned symbols is 1, while the number Y of symbols in the CORESET 846 is 2. Therefore, the UE 704 treats the reassigned symbol #7 827 as reserved, and the reassigned symbol #7 827 is counted in the PDCCH resource mapping process but the UE 704 does not receive PDCCH data in the reassigned symbol #7 827. More specifically, the UE 704 performs symbol-level rate-matching or puncturing in the reassigned symbol #7 827 and monitors PDCCH data in the symbol #6 826 not reassigned in the CORESET 846. As such, the UE 704 still treats the CORESET 846 as a two-symbol CORESET even though the symbol #7 827 is reassigned according to the dynamic SFI 806.

Figure 11:
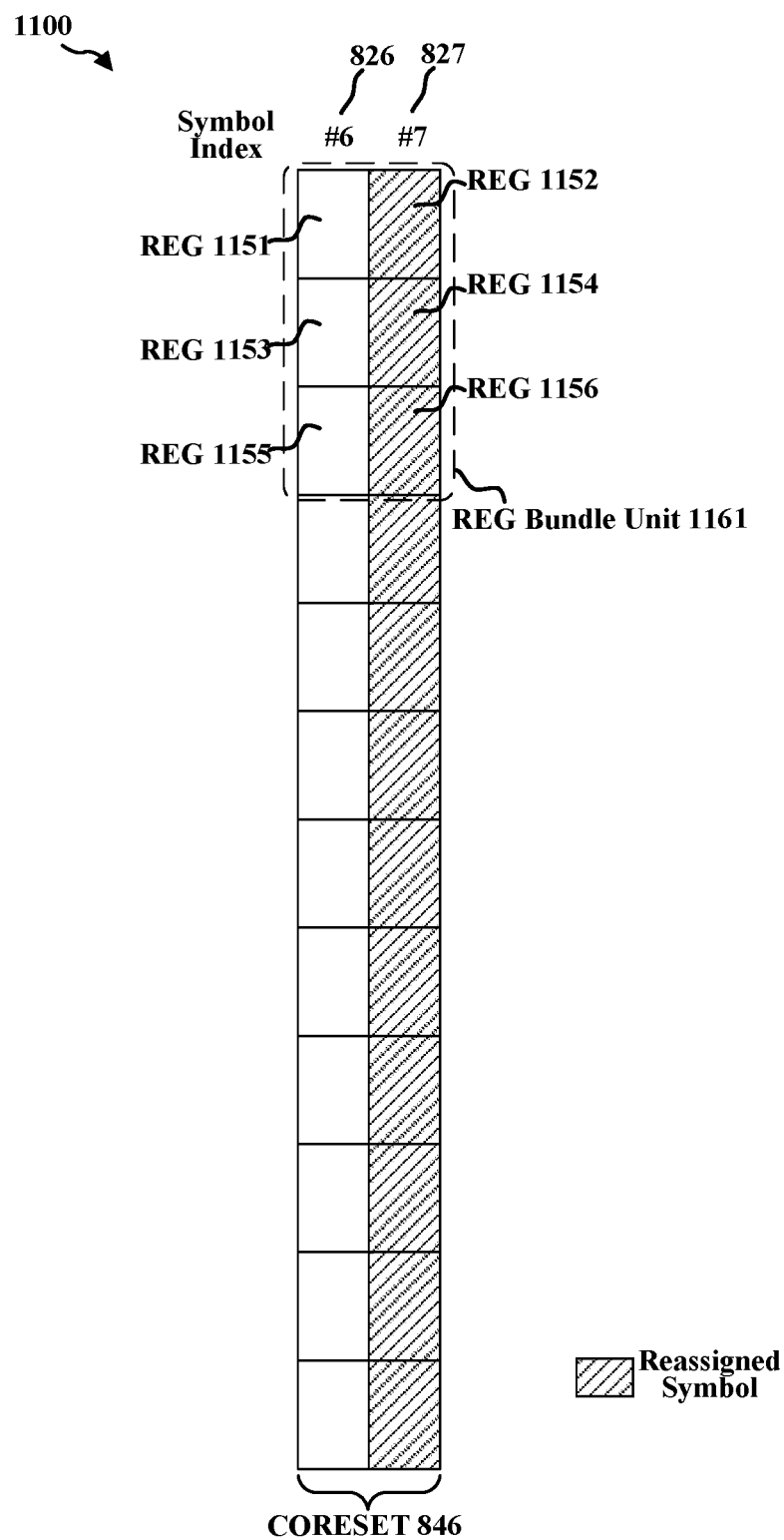
FIG. 11 is a diagram illustrating details of the second technique, as shown in FIG. 10, adopted by the UE in response to resource assignment collision between CORESET and dynamic SFI.

FIG. 11 is a diagram 1100 illustrating details of the second technique, as shown in FIG. 10, adopted by the UE 704 for handling resource assignment collisions between a CORESET and a dynamic SFI. In this example, a resource candidate is formed by a REG bundle unit 1161 with a size of 6 REGs. In particular, the REG bundle unit 1161 spans two symbols in the time domain 710: the symbol #6 826 and the symbol #7 827. In each of the two symbols, the REG bundle unit 1161 has three REGs. REGs 1151, 1153 and 1155 are in the symbol #6 826, and REGs 1152, 1154 and 1156 are in the symbol #7 827. As the symbol #7 827 is rate-matched or punctured, the UE 704 does not expect that it can receive any PDCCH data transmitted in the symbol #7 827.

Figure 12:
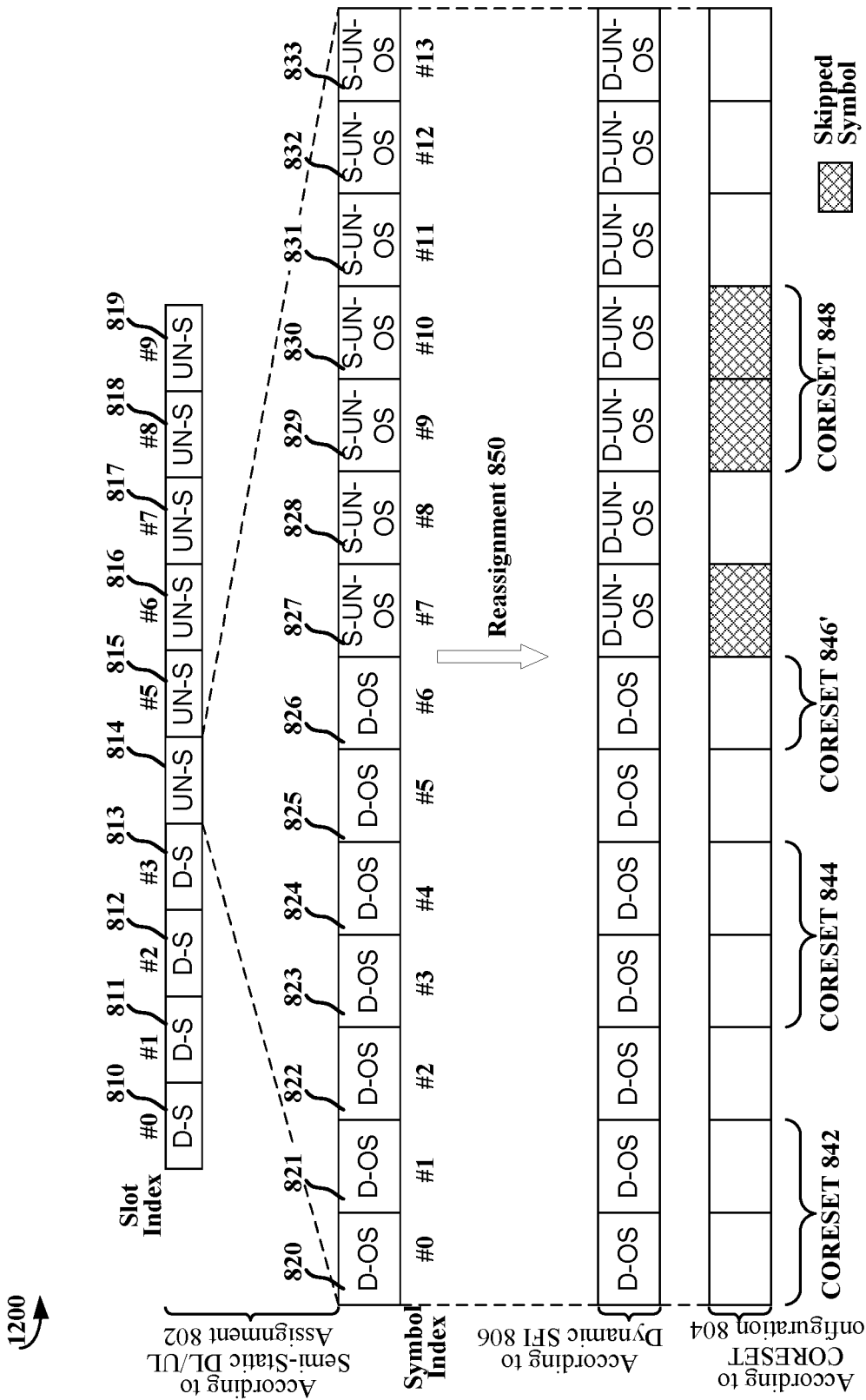
FIG. 12 is a diagram illustrating a third technique adopted by the UE in response to resource assignment collision between CORESET and dynamic SFI.

FIG. 12 is a diagram 1200 illustrating a third technique adopted by the UE 704 for handling resource assignment collisions between CORESET and dynamic SFI. Again, as shown in FIG. 8, there is a resource assignment collision between the CORESET 846 and the dynamic SFI 806 in the symbol #7 827. Similarly, there are resource assignment collisions between the CORESET 848 and dynamic SFI 806 in the symbol #9 829 and the symbol #10 830.

In certain configurations, the UE 704 may adopt a third technique. More specifically, if the number N (e.g., N is 1) of reassigned symbols is smaller than the number Y (e.g., Y is 2) of symbols in one CORESET (i.e., there is at least one symbol not reassigned in the CORESET), then the UE changes the CORESET configurations by its own for the reassigned symbols. For example, if a CORESET originally includes two symbols and the UE reassigns one of the two symbols, the UE treats the CORESET as a one-symbol CORESET and applies the original configurations to the one-symbol CORESET. Therefore, the coding gain is the same as that of the case that there is no resource assignment collision with the same aggregation level.

Similarly, in terms of PDCCH candidate number per aggregation level, the Option 2.1 or the Option 2.2 applies, just as in the second technique. Similarly, in terms of the total number of blind decoding, the Option 2.3 or the Option 2.4 applies, just as in the second technique.

In this example illustrated in FIG. 12, the UE 704 skips PDCCH data monitoring in the CORESET 848, because the symbol #9 829 and the symbol #10 830 within the CORESET 848 are both reassigned as dynamic unknown symbols (i.e., "D-UN-OS") according to the dynamic SFI 806. However, in the CORESET 846 (as shown in FIG. 8), the number N of reassigned symbols is 1, while the number Y of symbols in the CORESET 846 is 2. In other words, the UE 704 does not reassign the symbol #6 826 in the CORESET 846. Different from the second technique shown in FIGS. 10 and 11, the UE 704 reconfigures the two-symbol CORESET 846 to become a one-symbol CORESET 846' which only includes the symbol #6 826.

Figure 13:
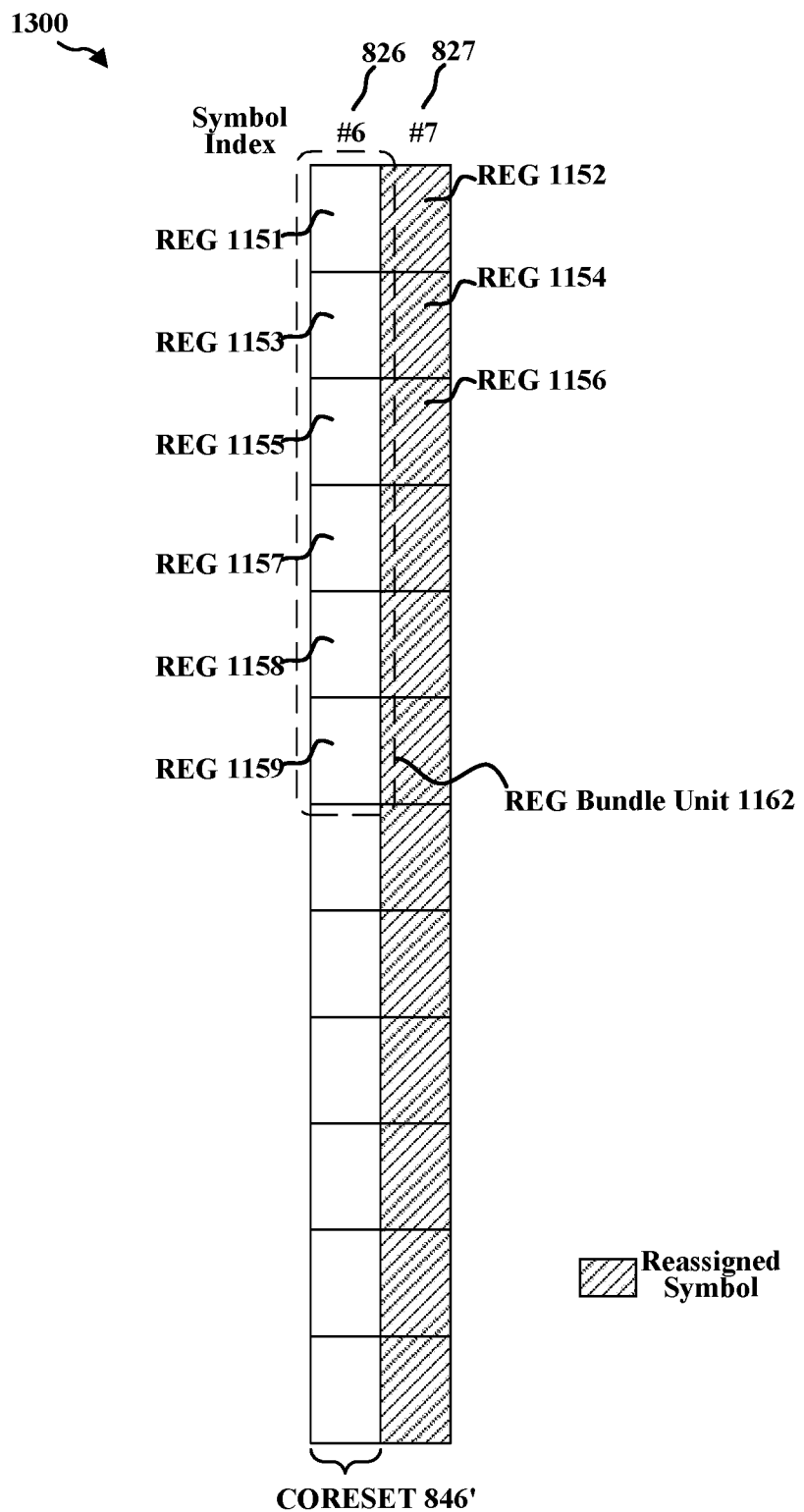
FIG. 13 is a diagram illustrating details of the third technique, as shown in FIG. 12, adopted by the UE in response to resource assignment collision between CORESET and dynamic SFI.

FIG. 13 is a diagram 1300 illustrating details of the third technique, as shown in FIG. 12, adopted by the UE 704 for handling resource assignment collisions between a CORESET and a dynamic SFI. In this example, a resource candidate is formed by a REG bundle unit 1162 with a size of 6 REGs. The REG bundle unit 1162 is different from the REG bundle unit 1161 shown in FIG. 11. In particular, the REG bundle unit 1162 spans only one symbol in the time domain 710: the symbol #6 826. The REG bundle unit 1162 includes six REGs 1151, 1153, 1155, 1157, 1158 and 1159 in the symbol #6 826. In contrast, in the second technique shown in FIGS. 10-11, the UE 704 decodes PDCCH data in only three REGs within a REG bundle unit 1161: the REGs 1151, 1153 and 1155 in the symbol #6 826.

It should be noted that when the number N (e.g., N is 3) of reassigned symbols equals to the number Y (e.g., Y is 3) of symbols in one CORESET (i.e., all symbol(s) in the CORESET are reassigned), then the second technique and the third technique have the same effect as the first technique. More specifically, the UE does not monitor PDCCH data in this entire CORESET. In other words, the UE skips PDCCH data monitoring in all symbol(s) in this CORESET.

Figure 14:
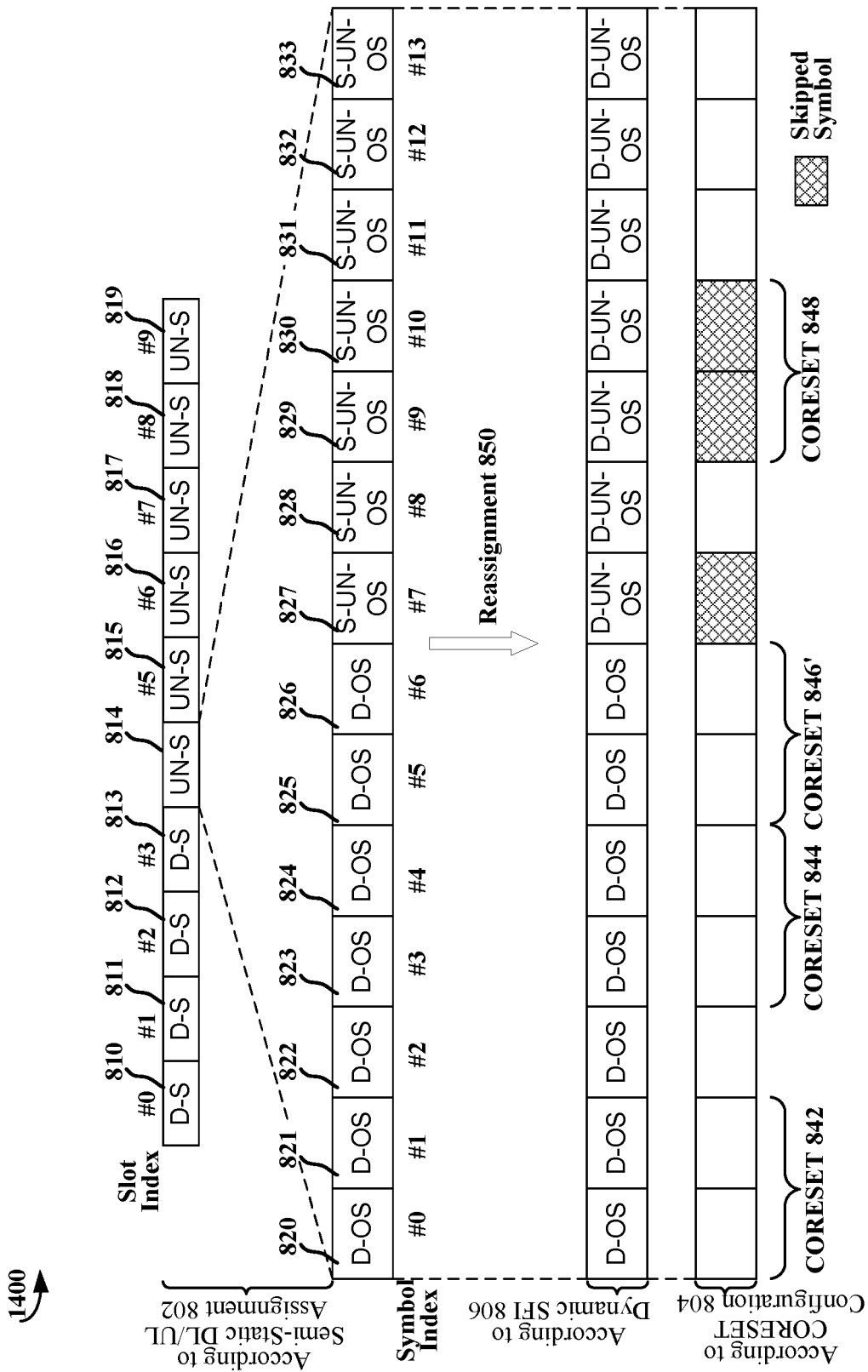
FIG. 14 is a diagram illustrating a fourth technique adopted by the UE in response to resource assignment collision between CORESET and dynamic SFI.

FIG. 14 is a diagram 1400 illustrating a fourth technique adopted by the UE 704 for handling resource assignment collisions between a CORESET and a dynamic SFI. Again, as shown in FIG. 8, there is a resource assignment collision between the CORESET 846 and the dynamic SFI 806 in the symbol #7 827. Similarly, there are resource assignment collisions between the CORESET 848 and dynamic SFI 806 in the symbol #9 829 and the symbol #10 830.

In certain configurations, the UE 704 may adopt a fourth technique. More specifically, the UE determines a shifted CORESET with the same number of symbols in the slot which does not overlap with any other CORESET or synchronization signal block. The shifted CORESET is adjacent to the reassigned symbol(s). In particular, the UE adds an offset with ±N symbols to the original CORESET, where N is the number of reassigned symbol(s). The UE shifts the original CORESET continually until there is no resource assignment collision between the shifted CORESET and the dynamic SFI. It should be noted that the shifted CORESET is still in the same slot. Moreover, the UE may keep the same CORESET configurations. If multiple shifted CORESETs with the same configurations complete overlap in the time domain 710 and in the frequency domain 706, the UE only monitors PDCCH data in one of those overlapping shifted CORESETs.

In this example illustrated in FIG. 14, the original CORESET 846 (as shown in FIG. 8) includes a reassigned symbols: the symbol #7 827. Therefore, the UE 704 shifts the original CORESET 846 to a shifted CORESET 846' in the slot #4 814. The shifted CORESET 846' includes two symbols: the symbol #5 825 and the symbol #6 826, neither of which is reassigned according to the dynamic SFI 806. The shifted CORESET 846' is adjacent (next) to the seven reassigned symbols (not monitored for PDCCH data): the symbol #7 827 to the symbol #13 833, and does not overlap with the CORESET 842 and the CORESET 844. From another perspective, the UE 704 adds an offset with −1 symbol to the original CORESET 846, and 1 is the number of reassigned symbol in the original CORESET 846. In other words, the UE 704 determines the shifted CORESET 846' by shifting the original CORESET 846 to the left by an offset of 1 symbol. After the shifting, the UE 704 still treats the shifted CORESET as a two-symbol CORESET, and the same configurations such as the REG bundle size may apply.

Figure 15:
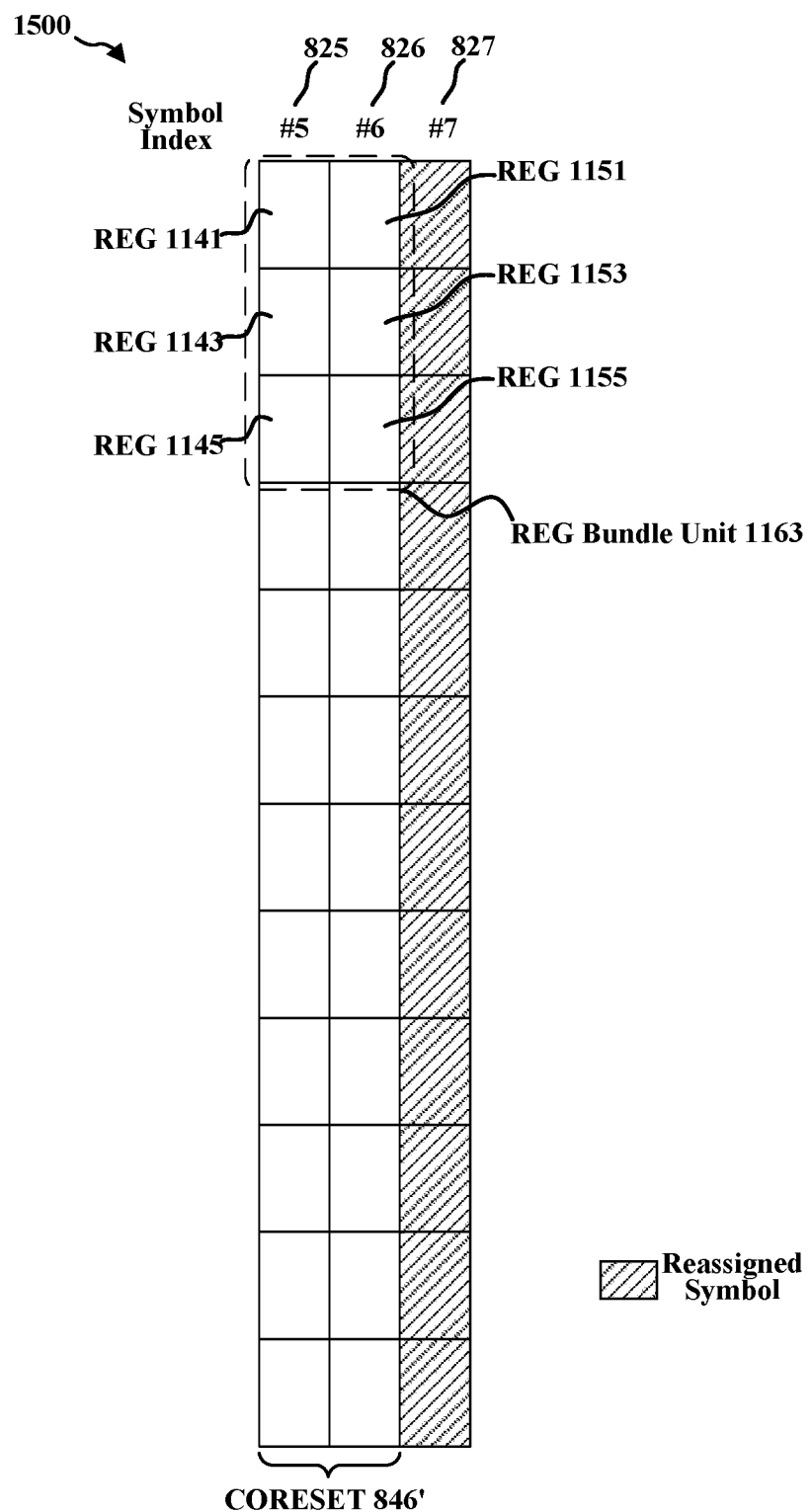
FIG. 15 is a diagram illustrating details of the fourth technique, as shown in FIG. 14, adopted by the UE in response to resource assignment collision between CORESET and dynamic SFI.

FIG. 15 is a diagram 1500 illustrating details of the fourth technique, as shown in FIG. 14, adopted by the UE 704 in response to resource assignment collision between CORESET and dynamic SFI. In this example, the UE 704 shifts the original CORESET 846 to the shifted CORESET 846'. The shifted CORESET 846' includes two symbols: the symbol #5 825 and the symbol #6 826, neither of which is reassigned according to the dynamic SFI 806. The shifted CORESET 846' is adjacent to the reassigned symbol #7 827, and does not overlap with the CORESET 842 and the CORESET 844. The UE 704 monitors PDCCH data by a REG bundle unit 1163 with a size of 6 REGs. In particular, the REG bundle unit 1163 spans two symbols in the time domain 710: the symbol #5 825 and the symbol #6 826. In each of the two symbols, the REG bundle unit 1163 has three REGs. REGs 1141, 1143 and 1145 are in the symbol #5 825, while REGs 1151, 1153 and 1154 are in the symbol #6 826. In summary, the REG bundle unit 1163 can be regarded as the REG bundle unit 1161 as shown in FIG. 11 being shifted to the left by 1 symbol.

Figure 16:
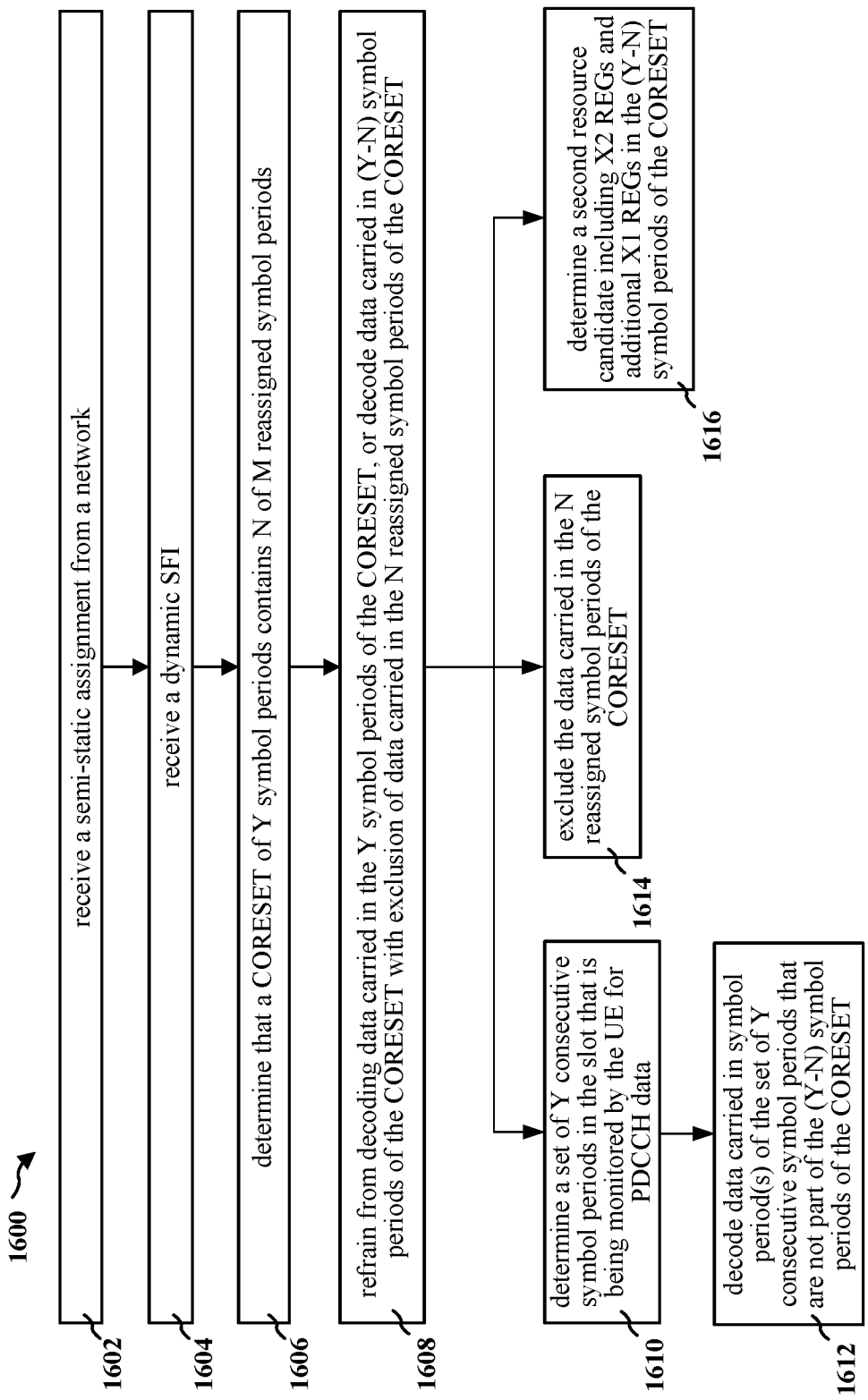
FIG. 16 is a flow chart illustrating a method (process) of solving resource assignment collision between CORESET and dynamic SFI.

FIG. 16 is a flow chart 1600 illustrating a method (process) of solving resource assignment collision between CORESET and dynamic SFI. The method may be performed by a UE (e.g., the UE 704, the apparatus 1702/1702'). At operation 1602, the UE 704 receives a semi-static assignment (e.g., the semi-static DL/UL assignment 802) from a network (e.g., the base station 702). The semi-static assignment indicating each of a plurality of symbol periods (e.g., the symbol #0 820 to the symbol #13 833) in a slot (e.g., the slot #4 814) being assigned as one of: a downlink symbol period (e.g., the DL symbol #6 826), a semi-static unknown symbol period (e.g., the semi-static unknown symbol #7 827), and an uplink symbol period.

At operation 1604, the UE 704 receives a dynamic SFI (e.g., the dynamic SFI 806). The dynamic SFI indicating M (e.g., 7) of the plurality of symbol periods being reassigned dynamically from semi-static unknown symbol periods to symbol periods (e.g., the dynamic unknown symbols #7 827 to #13 833) not being monitored by the UE for PDCCH data. M is an integer greater than 0. In some configurations, each of the dynamically reassigned M symbol periods is reassigned as one of: a dynamic unknown symbol period (e.g., the dynamic unknown symbol #7 827); and an uplink symbol period. In some configurations, the dynamic SFI is transmitted in a group-common physical downlink control channel (e.g., the GC-PDCCH 796).

At operation 1606, the UE 704 determines that a CORESET (e.g., the CORESET 846) of Y (e.g., 2) symbol periods contains N (e.g., 1) of the M reassigned symbol periods. Y is an integer greater than 0, and N is an integer greater than 0 and equal to or smaller than Y.

At operation 1608, the UE 704 either (1) refrains from decoding data carried in the Y symbol periods (e.g., the symbol #6 826 and the symbol #7 827) of the CORESET or (2) decodes data carried in (Y-N) symbol periods (e.g., the symbol #6 826) of the CORESET with exclusion of data carried in the N reassigned symbol periods (e.g., the symbol #7 827) of the CORESET.

Optionally, the method may continue.

Alternatively, at operation 1610 following operation 1608, the UE 704 determines a set of Y consecutive symbol periods (e.g., the symbol #5 825 and the symbol #6 826) in the slot that is being monitored by the UE for PDCCH data. The set of Y consecutive symbol periods does not overlap with any other CORESET (e.g., the CORESET 842, 844 and 848) or Synchronization Signal Block in the slot, wherein the set of Y consecutive symbol periods is adjacent to one or more consecutive symbol periods (e.g., the symbol #7 827 to the symbol #13 833) that are not being monitored by the UE for PDCCH data and that include the N reassigned symbol periods.

At operation 1612 following operation 1612, the UE 704 further decodes data carried in symbol period(s) (e.g., the symbol #6 826) of the set of Y consecutive symbol periods that are not part of the (Y-N) symbol periods of the CORESET.

Alternatively, at operation 1614 following operation 1608, the UE 704 excludes the data carried in the N reassigned symbol periods (e.g., the symbol #7 827) of the CORESET. The data carried in the (Y-N) symbol periods (e.g., the symbol #6 826) of the CORESET are decoded with exclusion of data carried in the N reassigned symbol periods (e.g., the symbol #7 827) of the CORESET. N is smaller than Y.

Alternatively, N is smaller than Y. The CORESET includes a first resource candidate (e.g., the REG bundle unit 1161) including X1 (e.g., 3) REGs (e.g., the REGs 1152, 1154 and 1156) in the N reassigned symbol periods (e.g., the symbol #7 827) of the CORESET and X2 (e.g., 3) REGs (e.g., the REGs 1151, 1153 and 1155) in the (Y-N) symbol periods (e.g., the symbol #6 826). X1 and X2 each is an integer greater than 0. At operation 1616, the UE 704 determines a second resource candidate (e.g., the REG bundle unit 1162) including X2 REGs (e.g., the REGs 1151, 1153 and 1155) and additional X1 REGs (e.g., the REGs 1157, 1158 and 1159) in the (Y-N) symbol periods (e.g., the symbol #6 826) of the CORESET. The data carried in the (Y-N) symbol periods of the CORESET are decoded with exclusion of data carried in the N reassigned symbol periods of the CORESET and are decoded by decoding data carried in the X2 REGs and the additional X1 REGs in the (Y-N) symbol periods of the CORESET.

Figure 17:
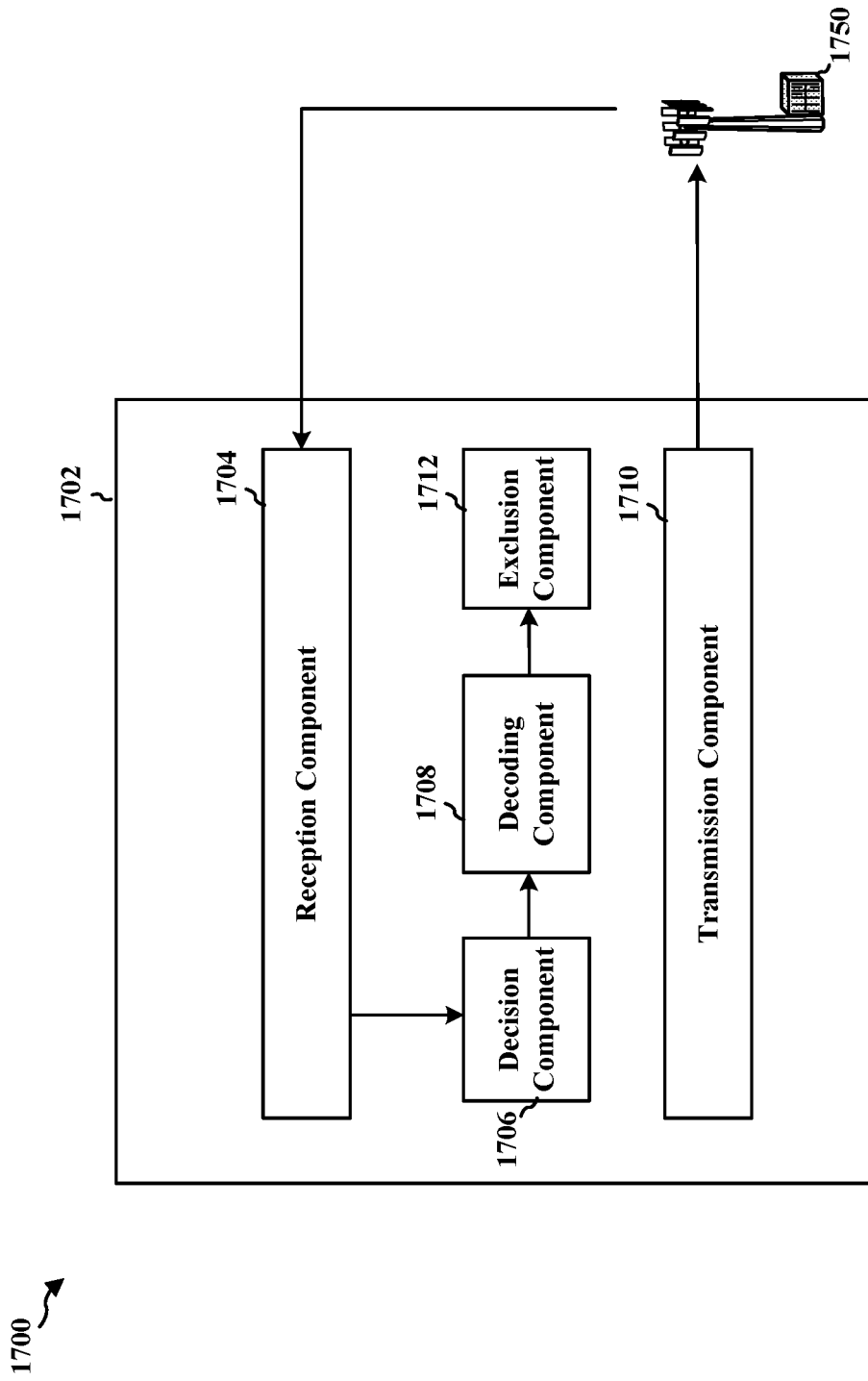
FIG. 17 is a conceptual data flow diagram illustrating the data flow between different components/means in an exemplary apparatus.

FIG. 17 is a conceptual data flow diagram 1700 illustrating the data flow between different components/means in an exemplary apparatus 1702. The apparatus 1702 may be a UE. The apparatus 1702 includes a reception component 1704, a decision component 1706, a decoding component 1708, an exclusion component 1712, and a transmission component 1710.

The reception component 1704 receives a semi-static assignment (e.g., the semi-static DL/UL assignment 802) from a network (e.g., the base station 702). The semi-static assignment indicating each of a plurality of symbol periods (e.g., the symbol #0 820 to the symbol #13 833) in a slot (e.g., the slot #4 814) being assigned as one of: a downlink symbol period (e.g., the DL symbol #6 826), a semi-static unknown symbol period (e.g., the semi-static unknown symbol #7 827), and an uplink symbol period.

The reception component 1704 receives a dynamic SFI (e.g., the dynamic SFI 806). The dynamic SFI indicating M (e.g., 7) of the plurality of symbol periods being reassigned dynamically from semi-static unknown symbol periods to symbol periods (e.g., the dynamic unknown symbols #7 827 to #13 833) not being monitored by the UE for PDCCH data. M is an integer greater than 0. In some configurations, each of the dynamically reassigned M symbol periods is reassigned as one of: a dynamic unknown symbol period (e.g., the dynamic unknown symbol #7 827); and an uplink symbol period. In some configurations, the dynamic SFI is transmitted in a group-common physical downlink control channel (e.g., the GC-PDCCH 796).

The decision component 1706 determines that a CORE-SET (e.g., the CORESET 846) of Y (e.g., 2) symbol periods contains N (e.g., 1) of the M reassigned symbol periods. Y is an integer greater than 0, and N is an integer greater than 0 and equal to or smaller than Y.

The decoding component 1708 either (1) refrains from decoding data carried in the Y symbol periods (e.g., the symbol #6 826 and the symbol #7 827) of the CORESET or (2) decodes data carried in (Y-N) symbol periods (e.g., the symbol #6 826) of the CORESET with exclusion of data carried in the N reassigned symbol periods (e.g., the symbol #7 827) of the CORESET.

Optionally and alternatively, the decision component 1706 determines a set of Y consecutive symbol periods (e.g., the symbol #5 825 and the symbol #6 826) in the slot that is being monitored by the UE for PDCCH data. The set of Y consecutive symbol periods does not overlap with any other CORESET (e.g., the CORESET 842, 844 and 848) or Synchronization Signal Block in the slot, wherein the set of Y consecutive symbol periods is adjacent to one or more consecutive symbol periods (e.g., the symbol #7 827 to the symbol #13 833) that are not being monitored by the UE for PDCCH data and that include the N reassigned symbol periods.

The decoding component 1708 further decodes data carried in symbol period(s) (e.g., the symbol #6 826) of the set of Y consecutive symbol periods that are not part of the (Y-N) symbol periods of the CORESET.

Alternatively, the exclusion component 1712 excludes the data carried in the N reassigned symbol periods (e.g., the symbol #7 827) of the CORESET. The data carried in the (Y-N) symbol periods (e.g., the symbol #6 826) of the CORESET are decoded with exclusion of data carried in the N reassigned symbol periods (e.g., the symbol #7 827) of the CORESET. N is smaller than Y.

Alternatively, N is smaller than Y. The CORESET includes a first resource candidate (e.g., the REG bundle unit 1161) including X1 (e.g., 3) REGs (e.g., the REGs 1152, 1154 and 1156) in the N reassigned symbol periods (e.g., the symbol #7 827) of the CORESET and X2 (e.g., 3) REGs (e.g., the REGs 1151, 1153 and 1155) in the (Y-N) symbol periods (e.g., the symbol #6 826). X1 and X2 each is an integer greater than 0. The decision component 1706 determines a second resource candidate (e.g., the REG bundle unit 1162) including X2 REGs (e.g., the REGs 1151, 1153 and 1155) and additional X1 REGs (e.g., the REGs 1157, 1158 and 1159) in the (Y-N) symbol periods (e.g., the symbol #6 826) of the CORESET. The data carried in the (Y-N) symbol periods of the CORESET are decoded with exclusion of data carried in the N reassigned symbol periods of the CORESET and are decoded by decoding data carried in the X2 REGs and the additional X1 REGs in the (Y-N) symbol periods of the CORESET.

Figure 18:
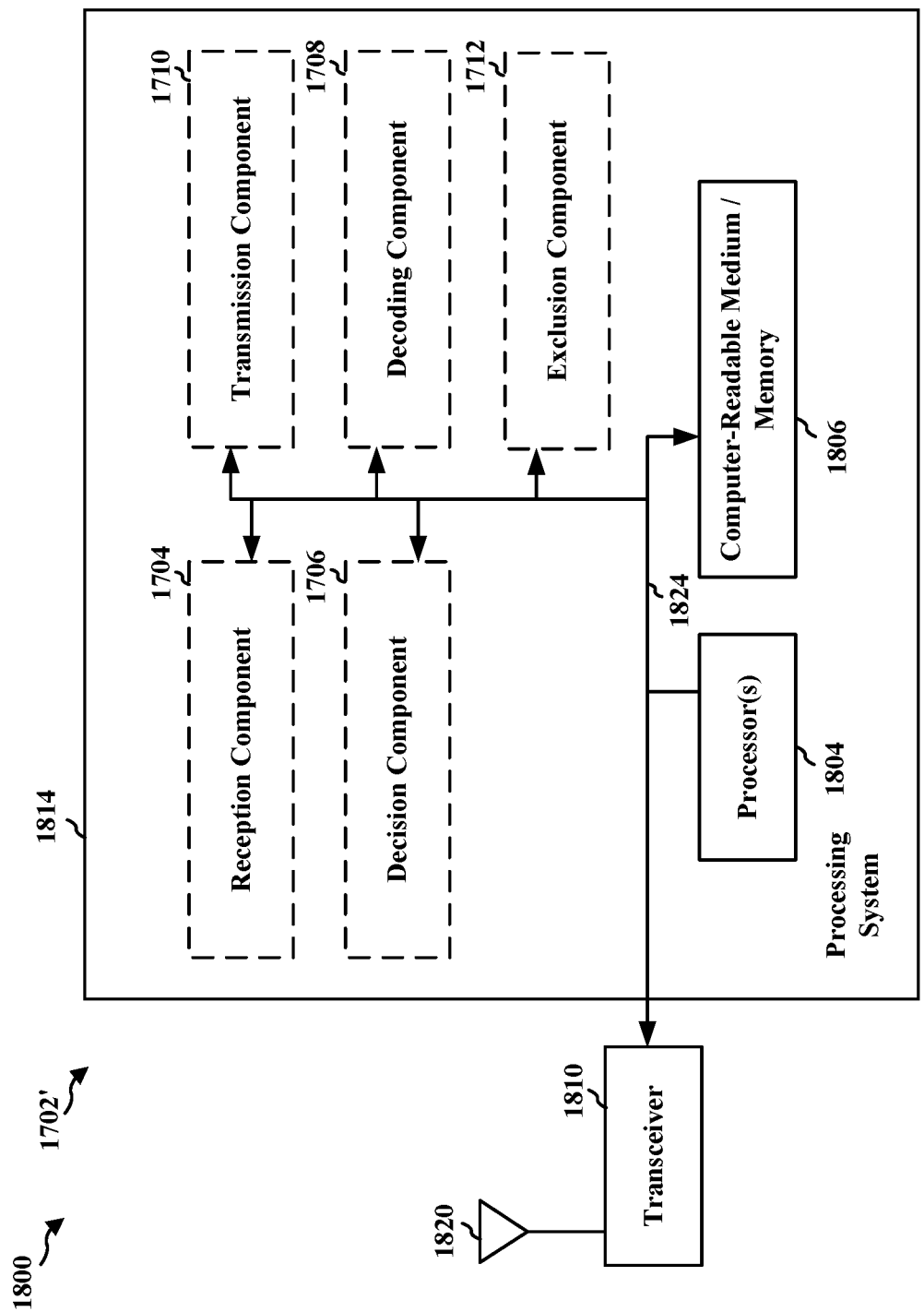
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The apparatus 1702' may be a UE. The processing system 1814 may be implemented with a bus architecture, represented generally by a bus 1824. The bus 1824 may include any number of interconnecting buses and bridges depending on the specific application of the processing system 1814 and the overall design constraints. The bus 1824 links together various circuits including one or more processors and/or hardware components, represented by one or more processors 1804, the reception component 1704, the decision component 1706, the decoding component 1708, the transmission component 1710, the exclusion component 1712, and a computer-readable medium/memory 1806. The bus 1824 may also link various other circuits such as timing sources, peripherals, voltage regulators, and power management circuits, etc.

The processing system 1814 may be coupled to a transceiver 1810, which may be one or more of the transceivers 254. The transceiver 1810 is coupled to one or more antennas 1820, which may be the communication antennas 252.

The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820.

The processing system 1814 includes one or more processors 1804 coupled to a computer-readable medium/memory 1806. The one or more processors 1804 are responsible for general processing, including the execution of software stored on the computer-readable medium/memory 1806. The software, when executed by the one or more processors 1804, causes the processing system 1814 to perform the various functions described supra for any particular apparatus. The computer-readable medium/memory 1806 may also be used for storing data that is manipulated by the one or more processors 1804 when executing software. The processing system 1814 further includes at least one of the reception component 1704, the decision component 1706, the decoding component 1708, the transmission component 1710, and the exclusion component 1712. The components may be software components running in the one or more processors 1804, resident/stored in the computer readable medium/memory 1806, one or more hardware components coupled to the one or more processors 1804, or some combination thereof. The processing system 1814 may be a component of the UE 250 and may include the memory 260 and/or at least one of the TX processor 268, the RX processor 256, and the communication processor 259.

In one configuration, the apparatus 1702/apparatus 1702' for wireless communication includes means for performing each of the operations of FIG. 16. The aforementioned means may be one or more of the aforementioned components of the apparatus 1702 and/or the processing system 1814 of the apparatus 1702' configured to perform the functions recited by the aforementioned means.

As described supra, the processing system 1814 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving a semi-static assignment from a network, the semi-static assignment indicating each of a plurality of symbol periods in a slot being assigned as one of:
   a downlink symbol period,
   a semi-static unknown symbol period, and
   an uplink symbol period;
   receiving a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;
   determining that a CORESET of Y symbol periods contains N of the M reassigned symbol periods, Y being an integer greater than 0, N being an integer greater than 0 and equal to or smaller than Y;
   (1) refraining from decoding data carried in the Y symbol periods of the CORESET or (2) decoding data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods;
   determining a set of Y consecutive symbol periods in the slot that is being monitored by the UE for PDCCH data, wherein the set of Y consecutive symbol periods does not overlap with any other CORESET or Synchronization Signal Block in the slot, wherein the set of Y consecutive symbol periods is adjacent to one or more consecutive symbol periods that are not being monitored by the UE for PDCCH data and that include the N reassigned symbol periods; and
   further decoding data carried in symbol period(s) of the set of Y consecutive symbol periods that are not part of the (Y-N) symbol periods of the CORESET.

2. The method of claim 1, wherein each of the dynamically reassigned M symbol periods is reassigned as one of:
   a dynamic unknown symbol period; and
   an uplink symbol period.

3. The method of claim 1, wherein the UE is refrained from decoding data carried in the Y symbol periods of the CORESET.

4. The method of claim 1, wherein the dynamic SFI is transmitted in a group-common physical downlink control channel (GC-PDCCH).

5. A method of wireless communication of a user equipment (UE), comprising:
   receiving a semi-static assignment from a network, the semi-static assignment indicating each of a plurality of symbol periods in a slot being assigned as one of:
   a downlink symbol period,
   a semi-static unknown symbol period, and
   an uplink symbol period;
   receiving a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;
   determining that a CORESET of Y symbol periods contains N of the M reassigned symbol periods, Y being an integer greater than 0, N being an integer greater than 0 and equal to or smaller than Y;
   (1) refraining from decoding data carried in the Y symbol periods of the CORESET or (2) decoding data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods; and
   excluding the data carried in the N reassigned symbol periods of the CORESET, wherein the data carried in the (Y-N) symbol periods of the CORESET are decoded with exclusion of data carried in the N reassigned symbol periods of the CORESET, wherein N is smaller than Y.

6. A method of wireless communication of a user equipment (UE), comprising:
   receiving a semi-static assignment from a network, the semi-static assignment indicating each of a plurality of symbol periods in a slot being assigned as one of:
   a downlink symbol period,
   a semi-static unknown symbol period, and
   an uplink symbol period;

receiving a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;

determining that a CORESET of Y symbol periods contains N of the M reassigned symbol periods, Y being an integer greater than 0, N being an integer greater than 0 and equal to or smaller than Y; and (1) refraining from decoding data carried in the Y symbol periods of the CORESET or (2) decoding data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods;

wherein N is smaller than Y, wherein the CORESET includes a first resource candidate including X1 resource element groups (REGs) in the N reassigned symbol periods of the CORESET and X2 REGs in the (Y-N) symbol periods, X1 and X2 each being an integer greater than 0, the method further comprising:

determining a second resource candidate including the X2 REGs and additional X1 REGs in the (Y-N) symbol periods of the CORESET, wherein the data carried in the (Y-N) symbol periods of the CORESET are decoded with exclusion of data carried in the N reassigned symbol periods of the CORESET and are decoded by decoding data carried in the X2 REGs and the additional X1 REGs in the (Y-N) symbol periods of the CORESET.

7. An apparatus for wireless communication, the apparatus being a user equipment (UE), comprising:
a memory; and
at least one processor coupled to the memory and configured to:
receive a semi-static assignment from a network, the semi-static assignment indicating each of a plurality of symbol periods in a slot being assigned as one of:
a downlink symbol period,
a semi-static unknown symbol period, and
an uplink symbol period;
receive a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;
determine that a CORESET of Y symbol periods contains N of the M reassigned symbol periods, Y being an integer greater than 0, N being an integer greater than 0 and equal to or smaller than Y;
(1) refrain from decoding data carried in the Y symbol periods of the CORESET or (2) decode data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods;
determine a set of Y consecutive symbol periods in the slot that is being monitored by the UE for PDCCH data, wherein the set of Y consecutive symbol periods does not overlap with any other CORESET or Synchronization Signal Block in the slot, wherein the set of Y consecutive symbol periods is adjacent to one or more consecutive symbol periods that are not being monitored by the UE for PDCCH data and that include the N reassigned symbol periods; and
further decode data carried in symbol period(s) of the set of Y consecutive symbol periods that are not part of the (Y-N) symbol periods of the CORESET.

8. The apparatus of claim 7, wherein each of the dynamically reassigned M symbol periods is reassigned as one of:
a dynamic unknown symbol period; and
an uplink symbol period.

9. The apparatus of claim 7, wherein the at least one processor is configured to:
refrain from decoding data carried in the Y symbol periods of the CORESET.

10. The apparatus of claim 7, wherein the dynamic SFI is transmitted in a group-common physical downlink control channel (GC-PDCCH).

11. An apparatus for wireless communication, the apparatus being a user equipment (UE), comprising:
a memory; and
at least one processor coupled to the memory and configured to:
receive a semi-static assignment from a network, the semi-static assignment indicating each of a plurality of symbol periods in a slot being assigned as one of:
a downlink symbol period,
a semi-static unknown symbol period, and
an uplink symbol period;
receive a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;
determine that a CORESET of Y symbol periods contains N of the M reassigned symbol periods, Y being an integer greater than 0, N being an integer greater than 0 and equal to or smaller than Y;
(1) refrain from decoding data carried in the Y symbol periods of the CORESET or (2) decode data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods; and
exclude the data carried in the N reassigned symbol periods of the CORESET, wherein the data carried in the (Y-N) symbol periods of the CORESET are decoded with exclusion of data carried in the N reassigned symbol periods of the CORESET, wherein N is smaller than Y.

12. An apparatus for wireless communication, the apparatus being a user equipment (UE), comprising:
a memory; and
at least one processor coupled to the memory and configured to:
receive a semi-static assignment from a network, the semi-static assignment indicating each of a plurality of symbol periods in a slot being assigned as one of:
a downlink symbol period,
a semi-static unknown symbol period, and
an uplink symbol period;

receive a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;

determine that a CORESET of Y symbol periods contains N of the M reassigned symbol periods, Y being an integer greater than 0, N being an integer greater than 0 and equal to or smaller than Y; and (1) refrain from decoding data carried in the Y symbol periods of the CORESET or (2) decode data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods;

wherein N is smaller than Y, wherein the CORESET includes a first resource candidate including X1 resource element groups (REGs) in the N reassigned symbol periods of the CORESET and X2 REGs in the (Y-N) symbol periods, X1 and X2 each being an integer greater than 0, the at least one processor is further configured to:

determine a second resource candidate including the X2 REGs and additional X1 REGs in the (Y-N) symbol periods of the CORESET, wherein the data carried in the (Y-N) symbol periods of the CORESET are decoded with exclusion of data carried in the N reassigned symbol periods of the CORESET and are decoded by decoding data carried in the X2 REGs and the additional X1 REGs in the (Y-N) symbol periods of the CORESET.

13. A non-transitory computer-readable medium storing computer executable code for wireless communication of wireless equipment, comprising code to:

receive a semi-static assignment from a network, the semi-static assignment indicating each of a plurality of symbol periods in a slot being assigned as one of:
a downlink symbol period,
a semi-static unknown symbol period, and
an uplink symbol period;

receive a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;

determine that a CORESET of Y symbol periods contains N of the M reassigned symbol periods, Y being an integer greater than 0, N being an integer greater than 0 and equal to or smaller than Y;

(1) refrain from decoding data carried in the Y symbol periods of the CORESET or (2) decode data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods;

determine a set of Y consecutive symbol periods in the slot that is being monitored by the UE for PDCCH data, wherein the set of Y consecutive symbol periods does not overlap with any other CORESET or Synchronization Signal Block in the slot, wherein the set of Y consecutive symbol periods is adjacent to one or more consecutive symbol periods that are not being monitored by the UE for PDCCH data and that include the N reassigned symbol periods; and further decode data carried in symbol period(s) of the set of Y consecutive symbol periods that are not part of the (Y-N) symbol periods of the CORESET.

14. The non-transitory computer-readable medium of claim 13, wherein each of the dynamically reassigned M symbol periods is reassigned as one of:
a dynamic unknown symbol period; and
an uplink symbol period.

15. The non-transitory computer-readable medium of claim 13, comprising code to:
refrain from decoding data carried in the Y symbol periods of the CORESET.

16. A non-transitory computer-readable medium storing computer executable code for wireless communication of wireless equipment, comprising code to:

receive a semi-static assignment from a network, the semi-static assignment indicating each of a plurality of symbol periods in a slot being assigned as one of:
a downlink symbol period,
a semi-static unknown symbol period, and
an uplink symbol period;

receive a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;

determine that a CORESET of Y symbol periods contains N of the M reassigned symbol periods, Y being an integer greater than 0, N being an integer greater than 0 and equal to or smaller than Y;

(1) refrain from decoding data carried in the Y symbol periods of the CORESET or (2) decode data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods; and exclude the data carried in the N reassigned symbol periods of the CORESET, wherein the data carried in the (Y-N) symbol periods of the CORESET are decoded with exclusion of data carried in the N reassigned symbol periods of the CORESET, wherein N is smaller than Y.

17. A non-transitory computer-readable medium storing computer executable code for wireless communication of wireless equipment, comprising code to:

receive a semi-static assignment from a network, the semi-static assignment indicating each of a plurality of symbol periods in a slot being assigned as one of:
a downlink symbol period,
a semi-static unknown symbol period, and
an uplink symbol period;

receive a dynamic slot format indicator (SFI), the dynamic SFI indicating M of the plurality of symbol periods being reassigned dynamically from semi-static unknown symbol periods to symbol periods not being monitored by the UE for physical downlink control channel (PDCCH) data, M being an integer greater than 0;

determine that a CORESET of Y symbol periods contains N of the M reassigned symbol periods, Y being an integer greater than 0, N being an integer greater than 0 and equal to or smaller than Y; and (1) refrain from decoding data carried in the Y symbol periods of the CORESET or (2) decode data carried in (Y-N) symbol periods of the CORESET with exclusion of data carried in the N reassigned symbol periods of the CORESET, the (Y-N) symbol periods of the CORESET being the symbol periods of the CORESET other than the N reassigned symbol periods;

wherein N is smaller than Y, wherein the CORESET includes a first resource candidate including X1 resource element groups (REGs) in the N reassigned symbol periods of the CORESET and X2 REGs in the (Y-N) symbol periods, X1 and X2 each being an integer greater than 0, the at least one processor is further configured to:

determine a second resource candidate including the X2 REGs and additional X1 REGs in the (Y-N) symbol periods of the CORESET, wherein the data carried in the (Y-N) symbol periods of the CORESET are decoded with exclusion of data carried in the N reassigned symbol periods of the CORESET and are decoded by decoding data carried in the X2 REGs and the additional X1 REGs in the (Y-N) symbol periods of the CORESET.

\* \* \* \* \*